United States Patent
Murai et al.

(10) Patent No.: US 9,632,564 B2
(45) Date of Patent: Apr. 25, 2017

(54) POWER SUPPLY DEVICE

(71) Applicants: CENTRAL JAPAN RAILWAY COMPANY, Aichi (JP); FUJI ELECTRIC CO., LTD., Kanagawa (JP)

(72) Inventors: Toshiaki Murai, Tokyo (JP); Yoshiyasu Hagiwara, Kanagawa (JP); Tadashi Sawada, Saitama (JP); Masayuki Tobikawa, Kanagawa (JP); Ayako Saga, Tokyo (JP); Michio Tamate, Tokyo (JP); Koji Maruyama, Tokyo (JP); Tomotaka Nishijima, Hyogo (JP)

(73) Assignees: CENTRAL JAPAN RAILWAY COMPANY, Nagoya-Shi, Aichi (JP); FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 14/300,822

(22) Filed: Jun. 10, 2014

(65) Prior Publication Data

US 2014/0372780 A1    Dec. 18, 2014

(30) Foreign Application Priority Data

Jun. 12, 2013   (JP) ................. 2013-123810

(51) Int. Cl.
*G06F 1/00* (2006.01)
*G06F 1/32* (2006.01)
(Continued)

(52) U.S. Cl.
CPC ............ *G06F 1/3287* (2013.01); *H02J 17/00* (2013.01); *H02M 7/219* (2013.01);
(Continued)

(58) Field of Classification Search
CPC ...... H02M 7/219; H02M 1/42; H02M 1/4258; H02M 7/5388
(Continued)

(56) References Cited

U.S. PATENT DOCUMENTS 5,581,171 A   12/1996   Kerfoot et al.
6,160,374 A   12/2000   Hayes et al.
(Continued)

FOREIGN PATENT DOCUMENTS

JP   2002-354711 A   12/2002
JP   2012-019603 A   1/2012
(Continued)

OTHER PUBLICATIONS

U.S. Appl. No. 14/200,790.

*Primary Examiner* — Vincent Tran
(74) *Attorney, Agent, or Firm* — Rabin & Berdo, P.C.

(57) ABSTRACT

In a power supply device, the bridge circuit is configured by connecting, in parallel, a plurality of series circuits of an inverse-parallel connection circuit of a semiconductor switch and a diode. A control unit controls switching of a semiconductor switch so that a voltage v between AC terminals becomes zero voltage in equal periods α before and after a center point shifted from one zero crossing point in one cycle of the input current by a compensation period (angle) β calculated from a voltage applied to a resonance circuit constituted by the power receiving coil and a resonance capacitor $C_r$ and an induced voltage of the power receiving coil, and becomes a positive-negative voltage whose peak value is the voltage $V_o$ between DC terminals in other periods.

6 Claims, 33 Drawing Sheets

(51) Int. Cl.
*H02J 17/00* (2006.01)
*H02M 7/219* (2006.01)
*H02M 1/00* (2006.01)

(52) U.S. Cl.
CPC .. *H02M 2001/0058* (2013.01); *Y02B 70/1441* (2013.01); *Y02B 70/1491* (2013.01)

(58) Field of Classification Search
USPC .......................................................... 713/323
See application file for complete search history.

(56) References Cited

U.S. PATENT DOCUMENTS

| | | | |
|---|---|---|---|
| 6,934,167 B2* | 8/2005 | Jang | H02J 5/005 363/21.02 |
| 8,446,134 B2* | 5/2013 | Manor | H02M 1/14 323/222 |
| 2004/0264089 A1* | 12/2004 | Furuya | H02J 3/38 361/92 |
| 2006/0267523 A1 | 11/2006 | Seelig et al. | |
| 2011/0254379 A1 | 10/2011 | Madawala | |
| 2011/0285211 A1* | 11/2011 | Endo | H02J 17/00 307/104 |
| 2012/0026755 A1* | 2/2012 | Wu | H02M 3/33592 363/17 |
| 2012/0032633 A1 | 2/2012 | Cordes et al. | |
| 2012/0127765 A1 | 5/2012 | Maruyama et al. | |
| 2012/0326515 A1 | 12/2012 | Murai et al. | |
| 2013/0154382 A1* | 6/2013 | Kurata | H02J 17/00 307/104 |
| 2013/0272044 A1 | 10/2013 | Boys et al. | |
| 2013/0336013 A1* | 12/2013 | Mueller | H02M 3/33569 363/17 |
| 2014/0117937 A1 | 5/2014 | Cho | |
| 2014/0191818 A1* | 7/2014 | Waffenschmidt | H02J 7/025 333/17.1 |
| 2014/0292092 A1* | 10/2014 | Ichinose | H02J 5/005 307/104 |
| 2014/0344601 A1 | 11/2014 | Huang et al. | |
| 2015/0001958 A1 | 1/2015 | Abe et al. | |
| 2015/0023079 A1 | 1/2015 | Sawada et al. | |
| 2015/0244176 A1 | 8/2015 | Van Den Brink et al. | |

FOREIGN PATENT DOCUMENTS

| | | |
|---|---|---|
| JP | 2012-125138 A | 6/2012 |
| JP | 2012-143135 A | 7/2012 |
| JP | 2012-253964 A | 12/2012 |
| JP | 2014-195387 A | 10/2014 |
| JP | 2015-023658 A | 2/2015 |
| WO | WO 2013-024396 A1 | 2/2013 |

\* cited by examiner

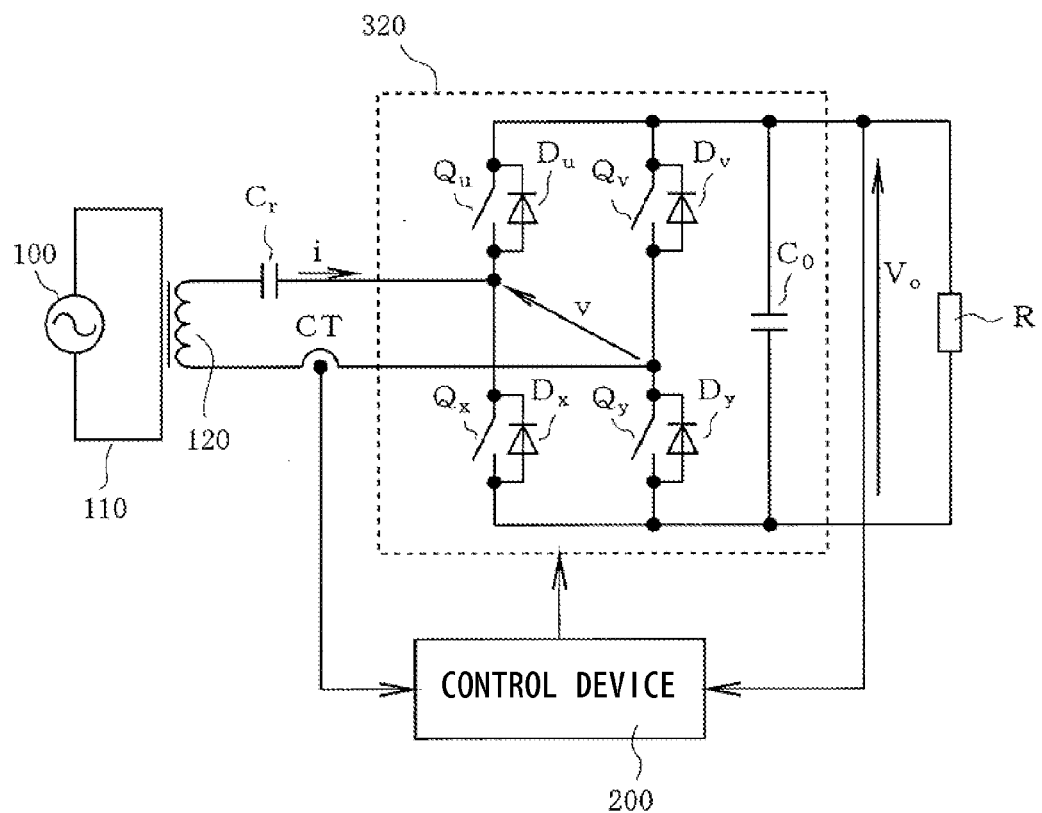
100 : HIGH FREQUENCY POWER SOURCE
110 : PRIMARY SIDE POWER SUPPLY LINE
120 : POWER RECEIVING COIL
320 : POWER RECEIVING CIRCUIT
Qu, Qx, Qv, Qy : SEMICONDUCTOR SWITCH
Du, Dx, Dv, Dy : DIODE
CO : SMOOTHING CAPACITOR
Cr : RESONANCE CAPACITOR
CT : CURRENT DETECTING UNIT
R : ROAD
F I G. 1

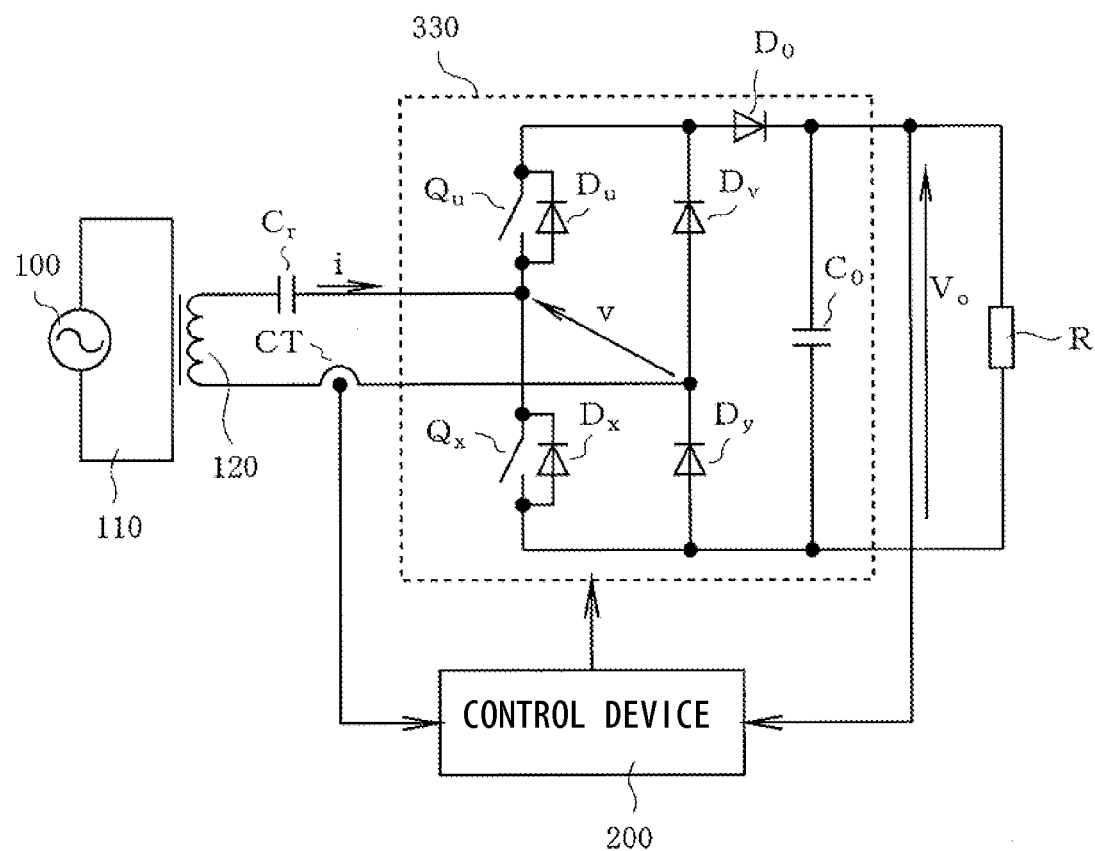
F I G. 5

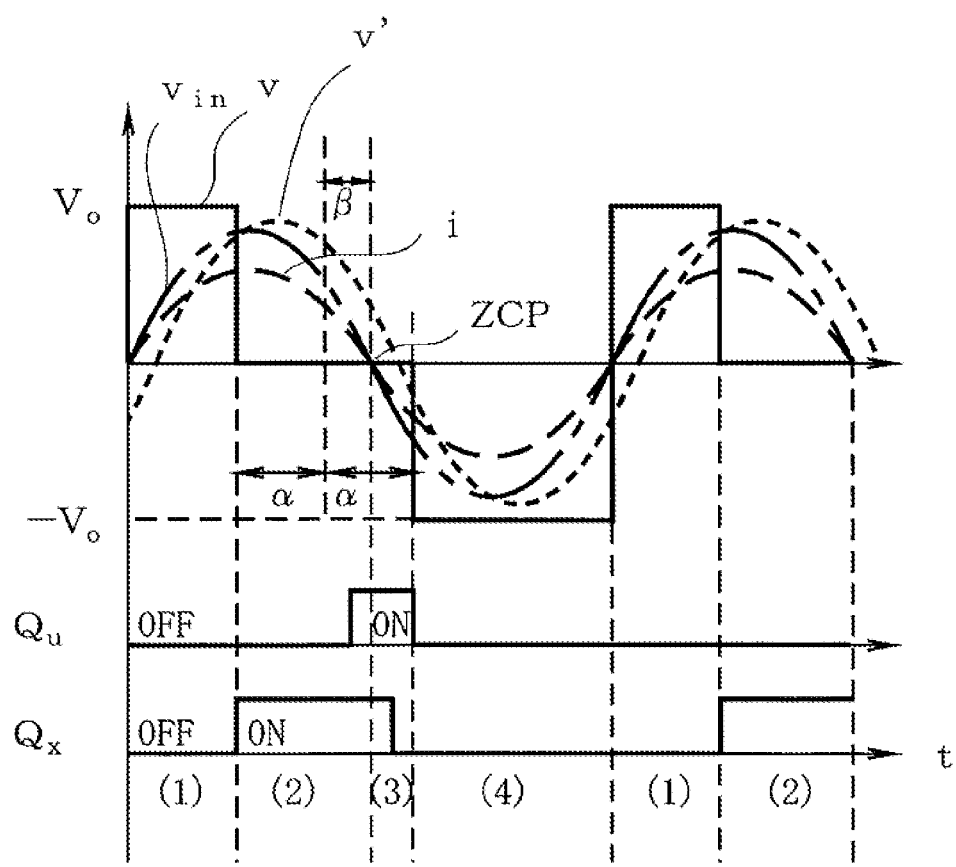
F I G. 8

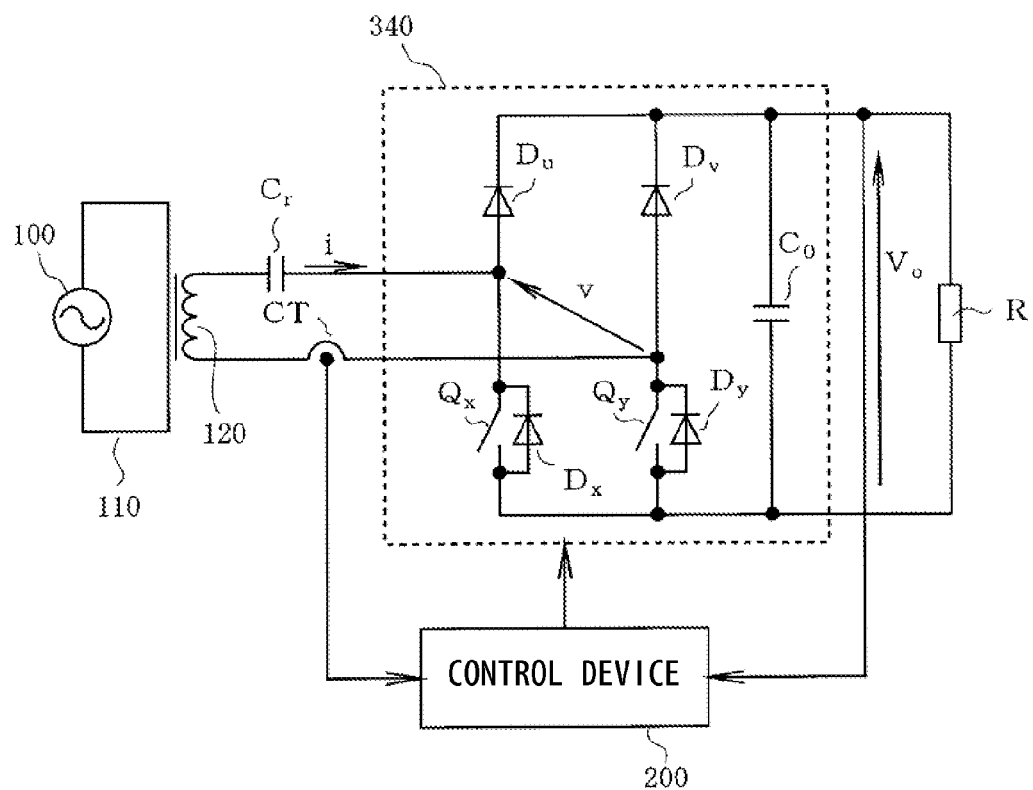
F I G. 10

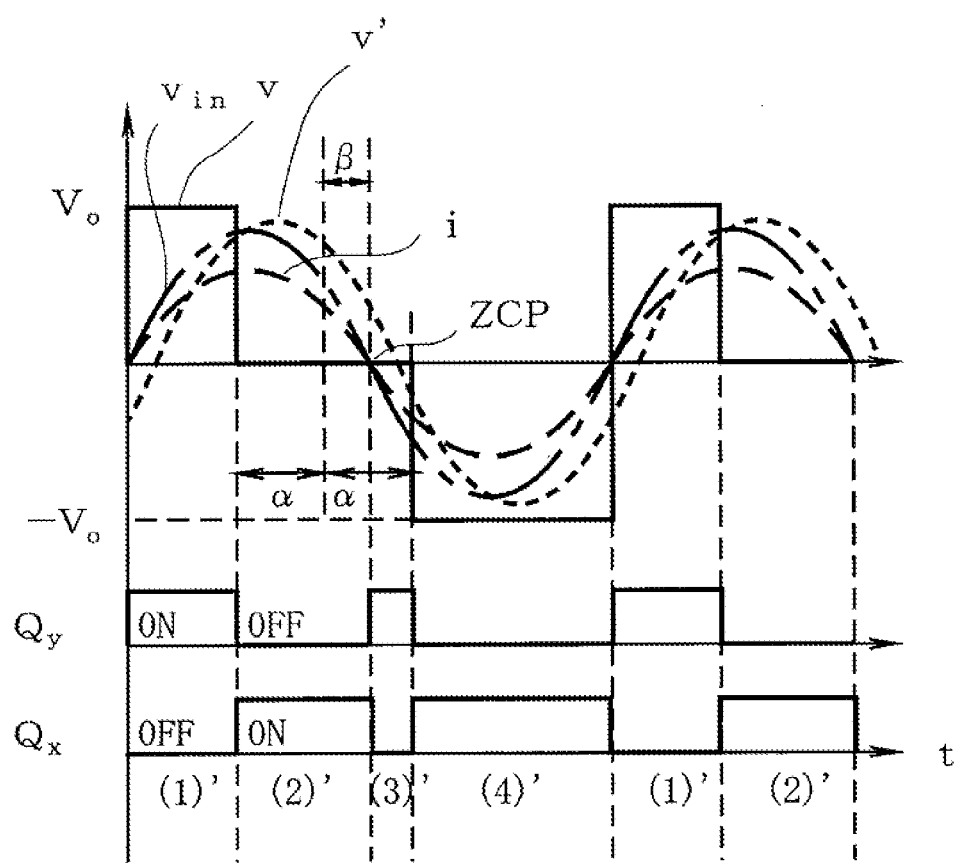
F I G. 11

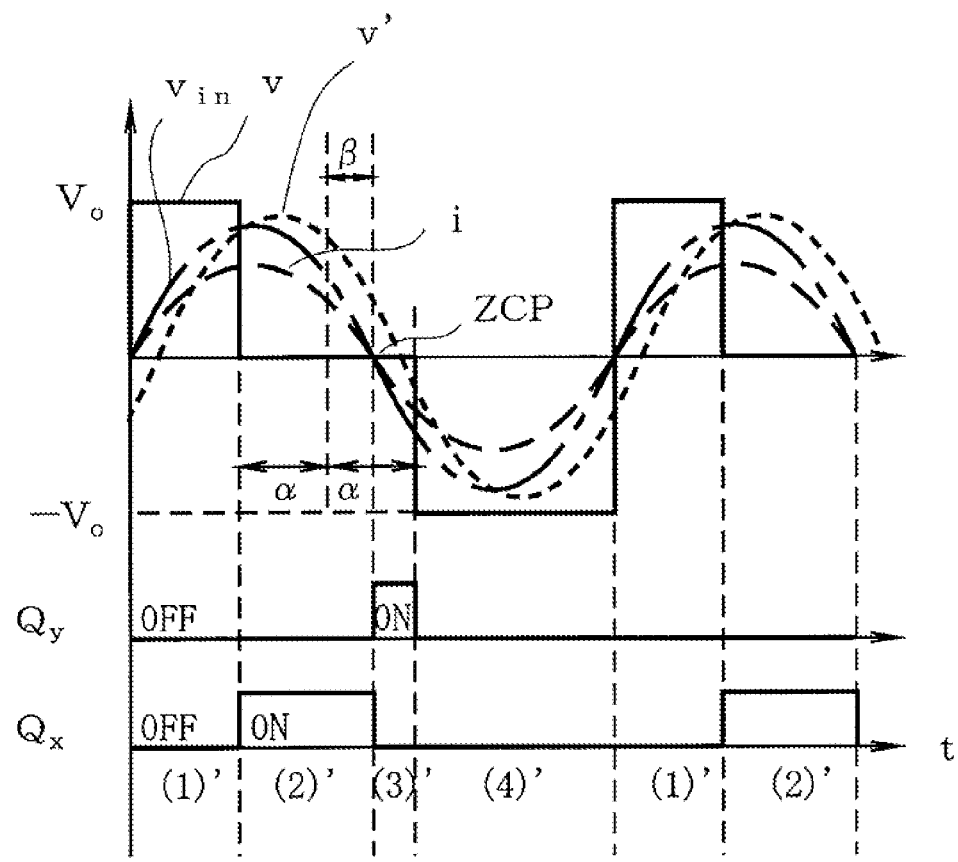
F I G. 1 2

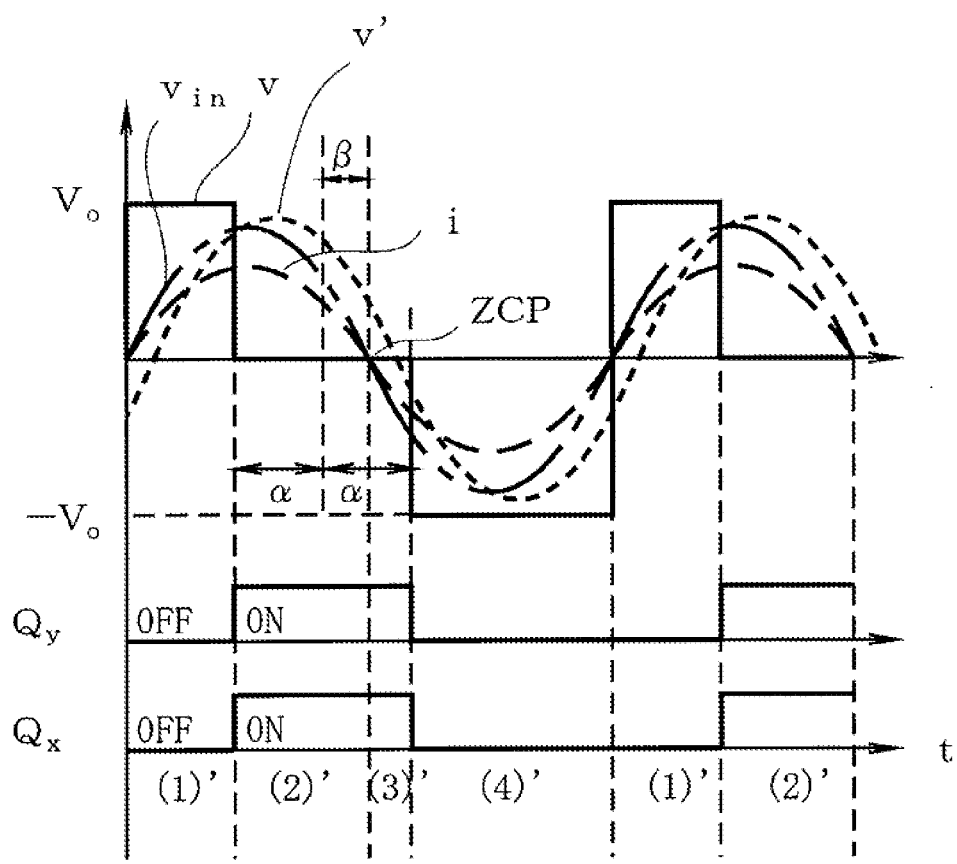
F I G. 14

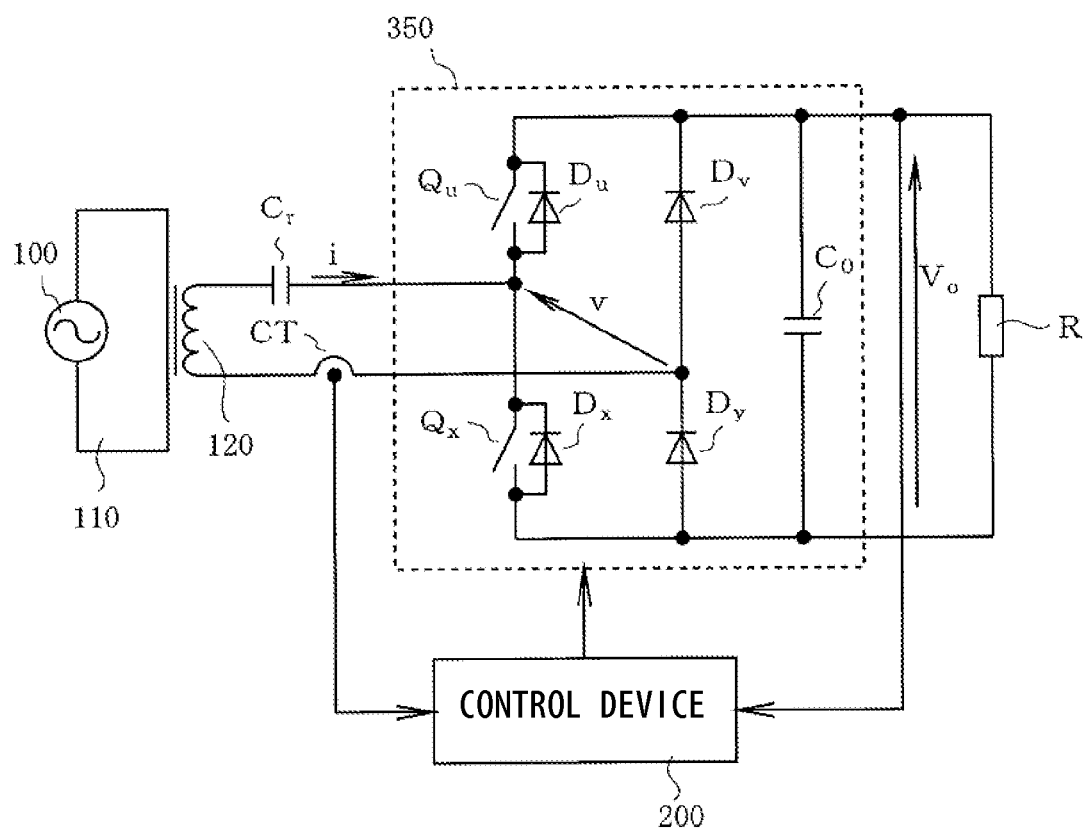
F I G. 17

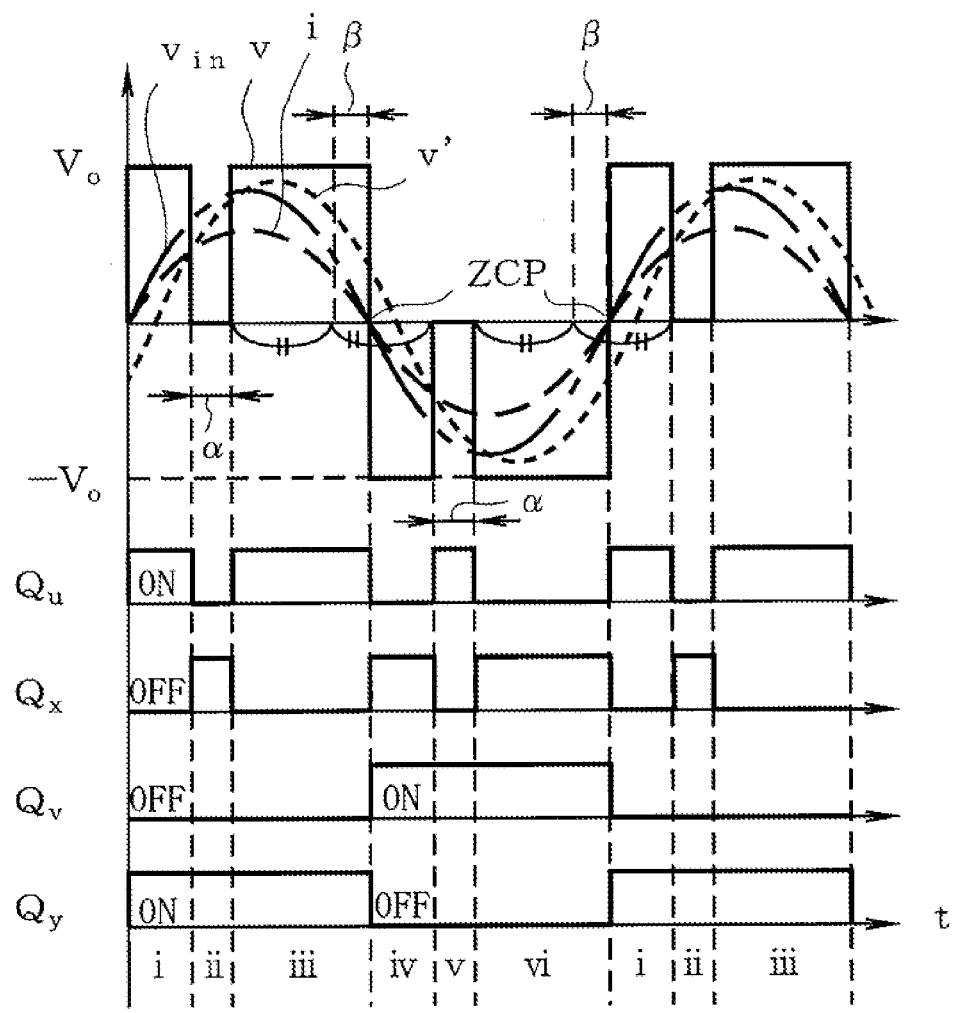
F I G. 2 2

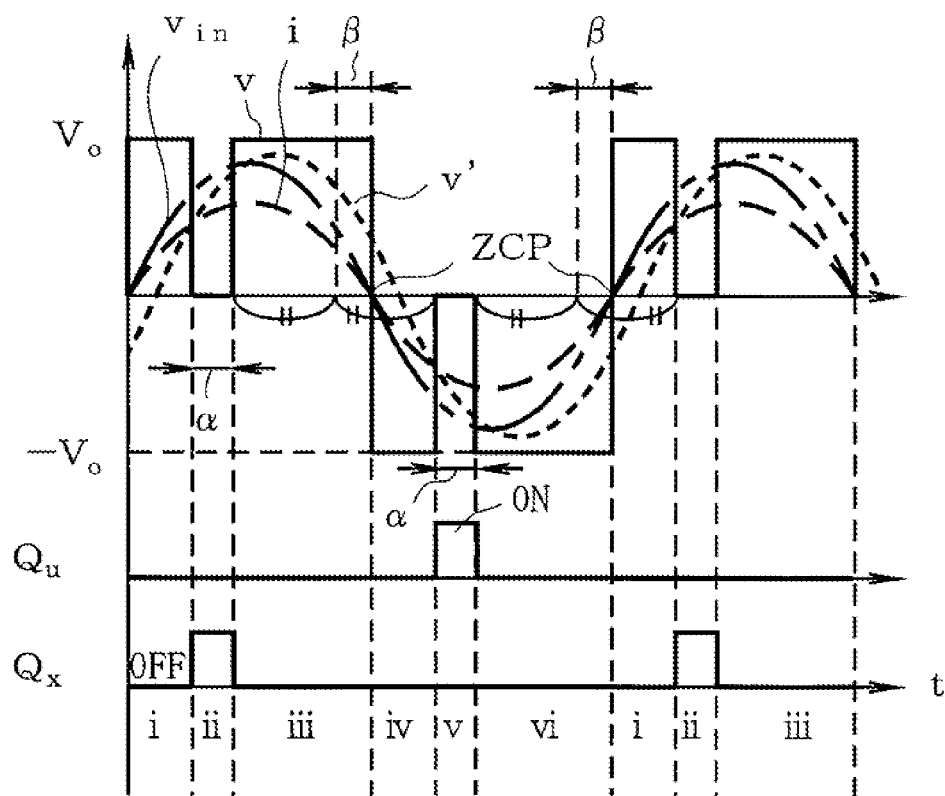
F I G. 2 5

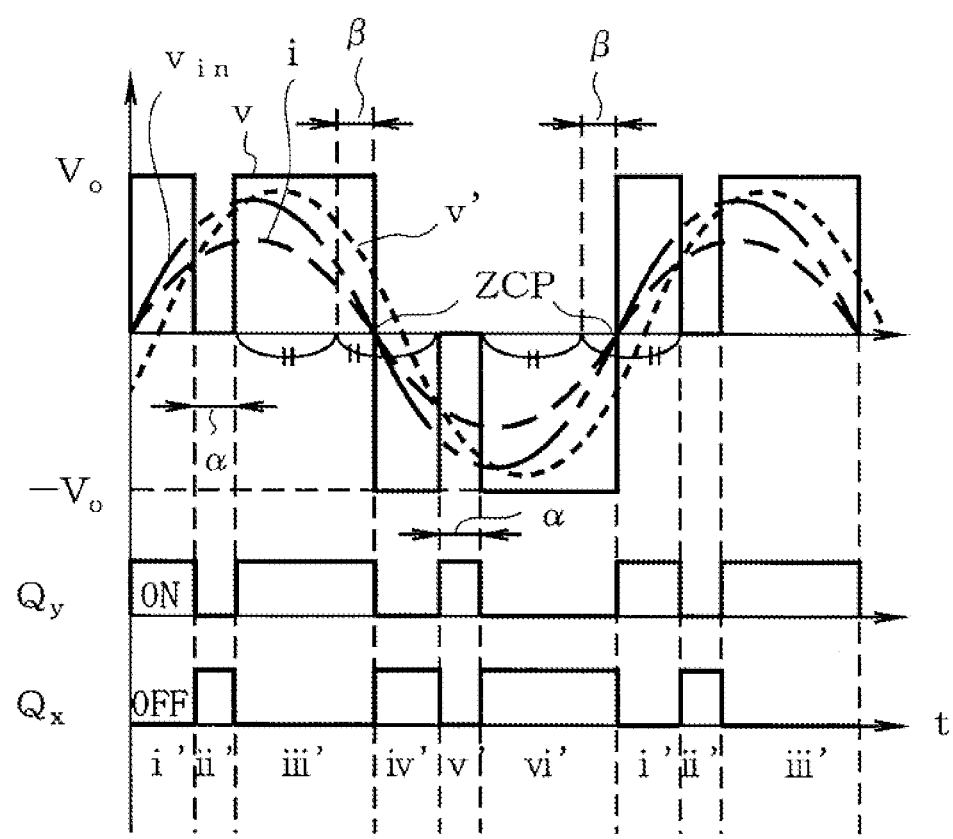
F I G. 26

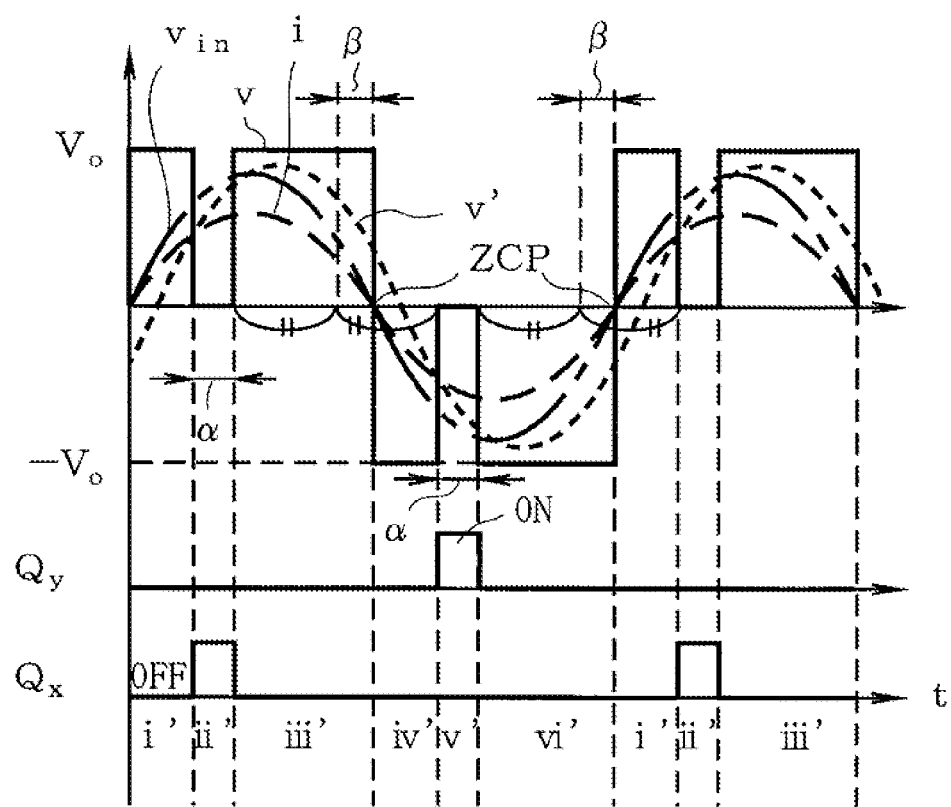
F I G. 27

POWER SUPPLY DEVICE

CROSS-REFERENCE TO RELATED APPLICATION

This application is based upon and claims the benefit of priority from prior Japanese Patent Application No. 2013-123810, filed Jun. 12, 2013, the entire contents of which are incorporated herein by this reference.

FIELD

The present invention relates to a power supply device that supplies power to a load using magnetic coupling mutually between coils.

BACKGROUND

Methods to supply power to a load using magnetic coupling mutually between coils by electromagnetic induction include, for example, non-contact power supply. Its principle is to form a so-called transformer by coupling a plurality of coils magnetically through a space, and to exchange power using electromagnetic induction between the coils.

For example, a primary side coil corresponding to the power supply source is arranged in a rail shape as a power supply line, and a secondary side coil and a power receiving circuit area integrated to constitute a mobile body, and also, the primary side coil and the secondary side coil are made to face each other. Accordingly, non-contact power supply may be conducted to the mobile object moving along the power supply line.

Here, FIG. 28 illustrates a non-contact power supply device described in Japanese Laid-open Patent Publication No. 2002-354711. In FIG. 28, to the both ends of a high frequency power source 100, a primary side power supply line 110 as a coil is connected. To the primary side power supply line 110, a power receiving coil 120 is coupled magnetically, and the primary side power supply line 110 and the power receiving coil 120 form a sort of transformer.

The both ends of the power receiving coil 120 are connected to a pair of AC (alternating-current) terminals of a full-wave rectifier circuit 10 through a resonance capacitor $C_r$. The power receiving coil 120 and the resonance capacitor $C_r$ constitute a serial resonance circuit.

The full-wave rectifier circuit 10 is configured by bridge-connecting diodes $D_u$, $D_v$, $D_x$, $D_y$.

To a pair of DC (direct-current) terminals of the full-wave rectifier circuit 10, a constant voltage control circuit 20 is connected which performs control so as to make the DC output voltage of the full-wave rectifier circuit 10 become equal to the reference voltage value. The constant voltage control circuit 20 is, for example, configured of a step-up chopper circuit which is formed, for example, of a reactor $L_1$, a diode $D_1$, a smoothing capacitor $C_0$ and a semiconductor switch $SW_1$, and to the both ends of the smoothing capacitor $C_0$, a load R is connected.

In FIG. 28 a control device for switching the semiconductor switch $SW_1$ is omitted.

In the conventional art of FIG. 28, the high frequency power source 100 flows a high frequency current into the primary side power supply line 110, the high frequency power supplied through the power receiving coil 120 is input into the full-wave rectifier circuit 10 and converted into DC power.

Generally, with this type of non-contact power supply device, due to a cause such as the change of the gap length between the primary side power supply line 110 and the power receiving coil 120 and the positional displacement of them, the voltage induced in the power receiving coil 120 changes, and accordingly, the DC output voltage of the full-wave rectifier circuit 10 fluctuates. In addition, the characteristics of the load R are also a cause of the fluctuation of the DC output power of the full-wave rectifier circuit 10.

For this reason, in the conventional art of FIG. 28, the DC output voltage of the full-wave rectifier circuit 10 is controlled to a constant value by the constant voltage control circuit 20.

In the non-contact power supply device, as the frequency of the current supplied through the coil becomes higher, the excitation inductance necessary for power transmission may be smaller, and the coil and the core placed in its periphery may be made smaller. However, in a power converter which configures the high frequency power source device or the power receiving circuit, as the frequency of the current flowing in the circuit becomes higher, the switching loss of the semiconductor switch increases and the power supply efficiency decreases. For this reason, the frequency of the power fed in a non-contact power is generally set to several [kHz] to several tens of [kHz].

The non-contact power supply device illustrated in FIG. 28, especially, the power receiving circuit in the subsequent stage of the resonance capacitor $C_r$ has the following problems.

(1) Since the power receiving circuit is configured by the full-wave rectifier circuit 10 and the constant voltage control circuit 20, the entire circuit becomes large, causing an expansion of the installation space and an increase in the cost.

(2) In addition to the diodes $D_u$, $D_v$, $D_x$, $D_y$ of the full-wave rectifier circuit 10, losses occur in the reactor $L_1$, the semiconductor switch $SW_1$, the diode $D_1$ of the constant voltage control circuit 20, and these losses is a factor for a decrease in the power supply efficiency.

As a conventional art to solve the problems described above, a non-contact power supply device and its control method described in Japanese Laid-open Patent Publication No. 2012-125138 have already been proposed by the inventors.

FIG. 29 illustrates a non-contact power supply device described in Japanese Laid-open Patent Publication No. 2012-125138.

In FIG. 29, 310 is a power receiving circuit. The power receiving circuit 310 includes semiconductor switches $Q_u$, $Q_x$, $Q_v$, $Q_y$, diodes $D_u$, $D_x$, $D_v$, $D_y$, capacitors $C_x$, $C_y$, and the smoothing capacitor $C_0$. The semiconductor switches $Q_u$, $Q_x$, $Q_v$, $Q_y$ are bridge-connected. The diodes $D_u$, $D_x$, $D_v$, $D_y$ are respectively connected in an inverse-parallel manner to the respective switches $Q_u$, $Q_x$, $Q_v$, $Q_y$. The capacitors $C_x$, $C_y$ are respectively connected in parallel to the switches $Q_x$, $Q_y$ of the lower arm. The smoothing capacitor $C_0$ is connected between DC terminals of a bridge circuit (full bridge inverter) configured by these elements. Between the AC terminals of the bridge circuit, a series circuit of a resonance capacitor $C_r$ and a power receiving coil 120 is connected, and to the both ends of the smoothing capacitor $C_0$, a load R is connected.

A control device 200 generates a driving signal for switching the semiconductor switches $Q_u$, $Q_x$, $Q_v$, $Q_y$. The control device 200 generates the driving signal based on a current i of the power receiving coil 120 detected by a current detection unit CT and a voltage between DC terminals (DC output voltage) $V_o$ of the power receiving circuit 310.

In this non-contact power supply device, by controlling the semiconductor switches $Q_u$, $Q_x$, $Q_v$, $Q_y$, the voltage v between AC terminals of the bridge circuit is controlled to a positive-negative voltage whose peak value is the voltage $V_o$ between DC terminals. The supply power from the primary side power supply line 110 to the power receiving circuit 310 is the product of the current i of the power receiving coil 120 and the voltage v between AC terminals. By the control of the phase of the driving signal of the semiconductor switches $Q_u$, $Q_x$, $Q_v$, $Q_y$ based on the voltage $V_o$ between DC terminals performed by the control device 200, the constant control of the supply power, that is, the voltage $V_o$ between DC terminals is enabled.

In addition, by configuring the power receiving circuit 310 by the bridge circuit configured by the switches $Q_u$, $Q_x$, $Q_v$, $Q_y$, and the diodes $D_u$, $D_x$, $D_v$, $D_y$, an operation to maintain the power constant even in a case in which the load R is a regenerative load is enabled.

According to this non-contact power supply device, without using constant voltage control circuit as in the conventional art of FIG. 28, the voltage $V_o$ between DC terminals may be controlled to be constant by the phase control of the driving signal of the semiconductor switches $Q_u$, $Q_x$, $Q_v$, $Q_y$. In addition, the power receiving circuit 310 may be configured by the bridge circuit and the smoothing capacitor $C_0$ only. Accordingly, the circuit configuration may be made simpler and smaller, and its cost may be reduced, and also, the loss may be reduced by reducing the number of component parts, to enable a high-efficiency, stable non-contact power supply. In addition, by the charging and discharging action of the capacitors $C_x$, $C_y$, the so-called soft switching is performed, making it possible to reduce the switching loss to further increase the efficiency.

However, in the conventional art described in Japanese Laid-open Patent Publication No. 2012-125138, the current i of the power receiving coil 120 becomes a leading phase to the fundamental wave component of the voltage v between AC terminals. For this reason, there is a problem that the input power factor of the power receiving circuit 310 decreases, which causes an increase in the loss of the entire device, being a factor that hinders further downsizing.

Then, the applicant has already proposed, as Japanese Patent Application No. 2013-071432 (hereinafter, referred to as the earlier application), a non-contact power supply device with an improvement in the input power factor of the power receiving circuit (hereinafter, referred to as the earlier application invention).

FIG. 30 is a circuit diagram of the earlier application invention.

In FIG. 30, a power receiving circuit 320 includes switches $Q_u$, $Q_x$, $Q_v$, $Q_y$, diodes $D_u$, $D_x$, $D_v$, $D_y$ and a smoothing capacitor $C_0$. The switches $Q_u$, $Q_x$, $Q_v$, $Q_y$ are bridge-connected. The diodes $D_u$, $D_x$, $D_v$, $D_y$ are respectively connected to the respective switches $Q_u$, $Q_x$, $Q_v$, $Q_y$, in an inverse-parallel manner. The smoothing capacitor $C_0$ is connected between a pair of DC terminals of a bridge circuit configured by these elements. Between a pair of AC terminals of the bridge circuit, a series circuit of a resonance capacitor $C_r$ and a power receiving coil 120 is connected, and to the both ends of the smoothing capacitor $C_0$, a load R is connected. 100 is a high frequency power source, and 110 is a primary side power supply line.

Meanwhile, the control device 200 generates and output a driving signal of the switches $Q_u$, $Q_x$, $Q_v$, $Q_y$, based on the voltage $V_o$ between DC terminals and the current i of the power receiving coil 120 detected by a current detecting unit CT. While it is not illustrated in the drawing, the voltage $V_o$ between DC terminals is detected by a known voltage detecting unit such as a DC voltage detector.

Next, in FIG. 30, operations in a case of supplying power from the power receiving coil 120 to the load R are explained.

FIG. 31 illustrates the current i of the power receiving coil 120, the voltage v between AC terminals of the bridge circuit, its fundamental wave component v', and the driving signals of the switches $Q_u$, $Q_x$, $Q_v$, $Q_y$. The switches $Q_u$, $Q_x$, $Q_v$, $Q_y$ performs a switching operation at a constant frequency synchronized with the current i. In FIG. 31, ZCP' indicates the zero crossing point of the current i.

The operations in the respective time periods (1) through (4) in FIG. 31 are explained below.

(1) Time period (1) (switches $Q_u$, $Q_y$ are turned on): The current i flows in the route of the resonance capacitor $C_r$→the diode $D_u$→the smoothing capacitor $C_0$→the diode $D_y$→the power receiving coil 120, and the voltage v becomes, as illustrated in the drawing, the positive voltage level corresponding to the voltage $V_o$ between DC terminals. In this period, the smoothing capacitor $C_0$ is charged by the current i.

(2) Time period (2) (switches $Q_x$, $Q_y$ are turned on): The current i flows in the route of the resonance capacitor $C_r$→switches $Q_x$→the diode $D_y$→the power receiving coil 120, and the voltage v becomes, as illustrated in the drawing, the zero voltage level.

(3) Time period (3) (switches $Q_u$, $Q_v$ are turned on): The current i flows in the route of the resonance capacitor $C_r$→the power receiving coil 120→the diode $D_v$→switches $Q_u$, and the voltage v becomes, as illustrated in the drawing, the zero voltage level.

(4) Time period (4) (switches $Q_x$, $Q_v$ are turned on): The current i flows in the route of the resonance capacitor $C_r$→the power receiving coil 120→the diode $D_v$→the smoothing capacitor $C_0$→the diode $D_x$, and the voltage v becomes, as illustrated in the drawing, the negative voltage level corresponding to the voltage $V_o$ between DC terminals. In this period, the smoothing capacitor $C_0$ is charged by the current i.

After this, changing to the switching mode in the period (1), similar operations are repeated.

As is apparent from FIG. 31, according to the earlier application invention, the control device 200 performs the switching control of the semiconductor switches $Q_u$, $Q_x$, $Q_v$, $Q_y$. Accordingly, the voltage v between AC terminals of the bridge circuit is controlled to be zero voltage only in a time period α before and after one of the zero crossing points ZCP' of the current i flowing in the power receiving coil 120, and to be a positive-negative voltage whose peak value is the voltage $V_o$ between DC terminals in the other time periods. The supply power from the primary side power supply line 110 to the power receiving circuit 320 is the product of the current i and the voltage v. Then, by the adjustment of the driving signals of the switches $Q_u$, $Q_x$, $Q_v$, $Q_y$ based on the detected value of the voltage $V_o$ between DC terminals by the control device 200, the control of the supply power, that is, the constant control of the voltage $V_o$ between DC terminals becomes possible.

At this time, as illustrated in FIG. 31, the phase difference between the current i flowing in the power receiving coil 120 and the fundamental wave component v' of the voltage v between AC terminals of the bridge circuit is 0°, the input power factor of the power receiving circuit 320 may be set as 1.

In the earlier application invention, when the resonance frequency by the power receiving coil 120 and the resonance capacitor $C_r$ completely matches the power source frequency, the input power factor of the power receiving circuit 320 becomes 1, but when the resonance frequency deviates from the power supply frequency, the input power factor of the power receiving circuit 320 decreases. The reason for it is explained below.

FIG. 32 illustrates an input side equivalent circuit of the power receiving circuit 320 in a case in which the resonance frequency by the power receiving coil 120 and the resonance capacitor $C_r$ deviates from the power source frequency. In FIG. 32, a voltage $v_{in}$ induced in the power receiving coil 120 is expressed as an AC power source, and a numeral 400 represents the impedance corresponding to the power receiving circuit 320 and the load R. However, generally, with respect to the load R, other impedances may be ignored, and therefore, the numeral 400 may be regarded as a pure resistance corresponding to the load R.

In addition, FIG. 33 illustrates the operating waveform of the current i flowing in the power receiving coil 120, the induced voltage $v_{in}$ of the power receiving coil 120, the voltage v between AC terminals of the bridge circuit and the fundamental wave component v' of the voltage v between AC terminals.

As illustrated in FIG. 32, the inductance of the power receiving coil 120 is assumed to be L[H], and the capacitance of the resonance capacitor $C_r$ is assumed to be $C_r$[F] in the same manner as the numeral of the component. When the power source frequency is further assumed as $f_s$[Hz], a combined inductance $L_s$[H] of the inductance L and the resonance capacitor $C_r$ is defined by the expression (1).

$$2\pi f_s L_s = 2\pi f_s L - \frac{1}{2\pi f_s C_r} \quad (1)$$

Meanwhile, the resonance frequency of a resonance circuit configured by the power receiving coil 120 and the resonance capacitor $C_r$ is expressed by the expression (2).

$$f_c = \frac{1}{2\pi\sqrt{LC_r}} \quad (2)$$

Therefore, when $f_c=f_s$, $L_s=0$ is established, and when $f_c \neq f_s$, $L_s \neq 0$ is established.

In addition, according to the control method presented in FIG. 31, the phase of v' matches the phase of i. For this reason, when the current i of the power receiving coil 120 is expressed as I sin ωt, v' may be expressed as V' sin ωt.

In this regard, $v_{in}$ is expressed by the sum of the fundamental wave component v' of v and $v_L$ from FIG. 32, as in the expression (3).

$$v_{in}(\omega t) = v'(\omega t) + v_L(\omega t) \quad (3)$$
$$= V'\sin(\omega t) + j(2\pi f_s)L_s I\sin(\omega t)$$
$$= V'\sin(\omega t) + 2\pi f_s L_s I\cos(\omega t)$$
$$= V_a\sin(\omega t + \theta)$$
$$\left(V_a = \sqrt{V'^2 + (2\pi f_s L_s I)^2}, \theta = \arcsin(2\pi f_s L_s I/V_a)\right)$$

When $L_s=0$, $v_{in}=V'$ sin ωt is established, and the phase difference θ between $v_{in}$ and i (=I sin ωt) becomes zero, and the input power factor of the power receiving circuit 320 becomes 1. However, when $L_s \neq 0$, as illustrated in FIG. 33, there is a phase difference θ between $v_{in}$ and i, and it follows that the input power factor decreases.

SUMMARY

Therefore, a problem to be solved by the present invention is to provide a power supply device with which, even in the case of $L_s \neq 0$, that is, when the resonance frequency of a resonance circuit configured by a power receiving coil and a resonance capacitor does not match the power source frequency, it is possible to suppress the loss in the entire device by improving the input power factor of a power receiving circuit, and to make the power supply device smaller and to lower its cost.

In order to solve the problem described above, a power supply device according to claim 1 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor, and the bridge circuit is constituted including, at least for one phase, a switching arm series circuit in which two inverse-parallel connection circuits of a semiconductor switch and a diode are connected in series, where, the respective configurations below are included.

A current detecting unit configured to detect an input current flowing in the power receiving coil;

A voltage detecting unit configured to detect a voltage between DC terminals of the bridge circuit; and A control unit configured to perform switching of the semiconductor switch.

Then, the control unit performs, switching of the semiconductor switch so that a voltage between AC terminals of the bridge circuit becomes zero voltage in equal periods before and after a center point shifted from one zero crossing point in one cycle of the input current by a compensation period calculated from a voltage applied to the resonance circuit and an induced voltage of the power receiving coil, and becomes a positive-negative voltage whose peak value is the voltage between DC terminals in other periods.

The invention according to claim 2 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor; and the bridge circuit is constituted by connecting, in parallel, a plurality of series circuits of, a diode and an inverse-parallel connection circuit of a semiconductor switch and a diode, where, the respective configurations below are included.

A current detecting unit configured to detect an input current flowing in the power receiving coil;

A voltage detecting unit configured to detect an voltage between DC terminals of the bridge circuit; and A control unit configured to perform switching of the semiconductor switch.

Then, the control unit performs switching of the semiconductor switch so that a voltage between AC terminals of the bridge circuit becomes zero voltage in equal periods before and after a center point shifted from one zero crossing point in one cycle of the input current by a compensation period calculated from a voltage applied to the resonance circuit and an induced voltage of the power receiving coil, and becomes a positive-negative voltage whose peak value is the voltage between DC terminals in other periods.

The invention according to claim 3 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor; and the bridge circuit is constituted including, at least for one phase, a switching arm series circuit in which two inverse-parallel connection circuits of a semiconductor switch and a diode are connected in series, where, the respective configurations below are included.

A current detecting unit configured to detect an input current flowing in the power receiving coil;

A voltage detecting unit configured to detect a voltage between DC terminals of the bridge circuit; and A control unit configured to perform switching of the semiconductor switch.

Then, the control unit performs switching of the semiconductor switch so that a voltage between AC terminals of the bridge circuit becomes zero voltage in equal periods before and after a center point shifted from respective zero crossing points in one cycle of the input current by a compensation period calculated from a voltage applied to the resonance circuit and an induced voltage of the power receiving coil, and becomes a positive-negative voltage whose peak value is the voltage between DC terminals in other periods.

The invention according to claim 4 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor; and the bridge circuit is constituted by connecting, in parallel, a plurality of series circuits of, a diode and an inverse-parallel connection circuit of a semiconductor switch and a diode, where, the respective configurations below are included.

A current detecting unit configured to detect an input current flowing in the power receiving coil;

A voltage detecting unit configured to detect a voltage between DC terminals of the bridge circuit; and A control unit configured to perform switching of the semiconductor switch.

Then, the control unit performs switching of the semiconductor switch so that a voltage between AC terminals of the bridge circuit becomes zero voltage in equal periods before and after a center point shifted from respective zero crossing points in one cycle of the input current by a compensation period calculated from a voltage applied to the resonance circuit and an induced voltage of the power receiving coil, and becomes a positive-negative voltage whose peak value is the voltage between DC terminals in other periods.

The invention according to claim 5 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor; and the bridge circuit is constituted including, at least for one phase, a switching arm series circuit in which two inverse-parallel connection circuits of a semiconductor switch and a diode are connected in series, where, the respective configurations below are included.

A current detecting unit configured to detect an input current flowing in the power receiving coil;

A voltage detecting unit configured to detect a voltage between DC terminals of the bridge circuit; and A control unit configured to perform switching of the semiconductor switch.

Then, the control unit performs switching of the semiconductor switch so that a voltage between AC terminals of the bridge circuit becomes a positive-negative voltage whose peak value is the voltage between DC terminals in equal periods before and after a center point shifted from respective zero crossing points in one cycle of the input current by a compensation period calculated from a voltage applied to the resonance circuit and an induced voltage of the power receiving coil, and becomes zero voltage in other periods.

The invention according to claim 6 of the present invention includes a power receiving coil configured to exchange power by an external magnetic coupling, a bridge circuit in which one end of the power receiving coil is connected to one AC terminal through a resonance capacitor configuring a resonance circuit with the power receiving coil, and another end of the power receiving coil is connected to another AC terminal, and a smoothing capacitor connected between DC terminals of the bridge circuit, and a load is connected to both ends of the smoothing capacitor; and the bridge circuit is constituted by connecting, in parallel, a plurality of series circuits of, a diode and an inverse-parallel connection circuit of a semiconductor switch and a diode, where, the respective configurations below are included.

A current detecting unit configured to detect an input current flowing in the power receiving coil;

A voltage detecting unit configured to detect a voltage between DC terminals of the bridge circuit; and A control unit configured to perform switching of the semiconductor switch.

Then, the control unit performs switching of the semiconductor switch so that a voltage between AC terminals of the bridge circuit becomes a positive-negative voltage whose peak value is the voltage between DC terminals in equal periods before and after a center point shifted from respective zero crossing points in one cycle of the input current by a compensation period calculated from a voltage applied to the resonance circuit and an induced voltage of the power receiving coil, and becomes zero voltage in other periods.

BRIEF DESCRIPTION OF DRAWINGS

The present invention will be more apparent from the following detailed description when the accompanying drawings are referenced.

FIG. 1 is a circuit diagram presenting a first example of a power supply device according to the present invention.

FIG. 5 is a circuit diagram presenting a second example of a power supply device according to the present invention.

FIG. 8 is an operating waveform diagram of the first embodiment for the power supply device in FIG. 5.

FIG. 10 is a circuit diagram presenting a third example of a power supply device according to the present invention.

FIG. 11 is an operating waveform diagram of the first embodiment for the power supply device in FIG. 10.

FIG. 12 is an operating waveform diagram of the first embodiment for the power supply device in FIG. 10.

FIG. 14 is an operating waveform diagram of the first embodiment for the power supply device in FIG. 10.

FIG. 17 is a circuit diagram presenting a fourth example of a power supply device according to the present invention.

FIG. 22 is an operating waveform diagram of the third embodiment for the power supply device in FIG. 1.

FIG. 25 is an operating waveform diagram of the third embodiment for the power supply device in FIG. 17.

FIG. 26 is an operating waveform diagram of the third embodiment for the power supply device in FIG. 10.

FIG. 27 is an operating waveform diagram of the third embodiment for the power supply device in FIG. 10.

DESCRIPTION OF EMBODIMENTS

Hereinafter, embodiments of the present invention are explained along the drawings.

FIG. 1 is a circuit diagram illustrating the first example of a power supply device according to the present invention. The present invention may be applied to any of non-contact type and contact-type power supply devices, but in the respective embodiments below, a case in which the present invention is applied to a non-contact power supply device is explained.

Figure 30:
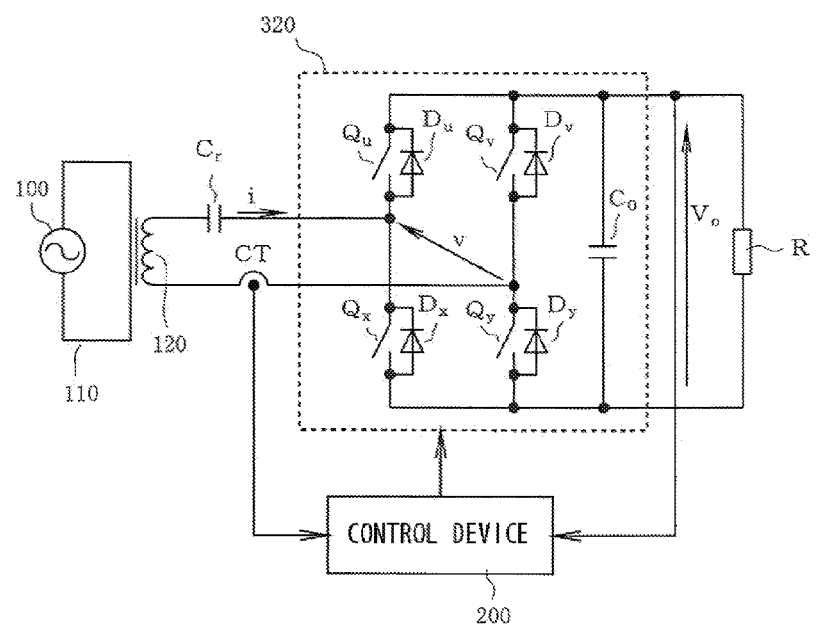
FIG. 30 is a circuit diagram of the earlier application invention.
Figure 31:
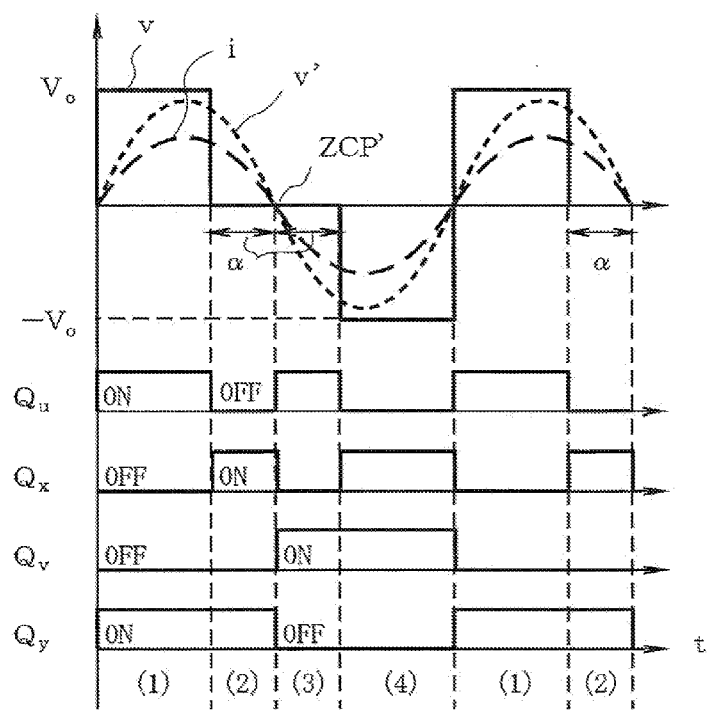
FIG. 31 is a diagram explaining the operation of the earlier application invention illustrated in FIG. 30.
Figure 32:
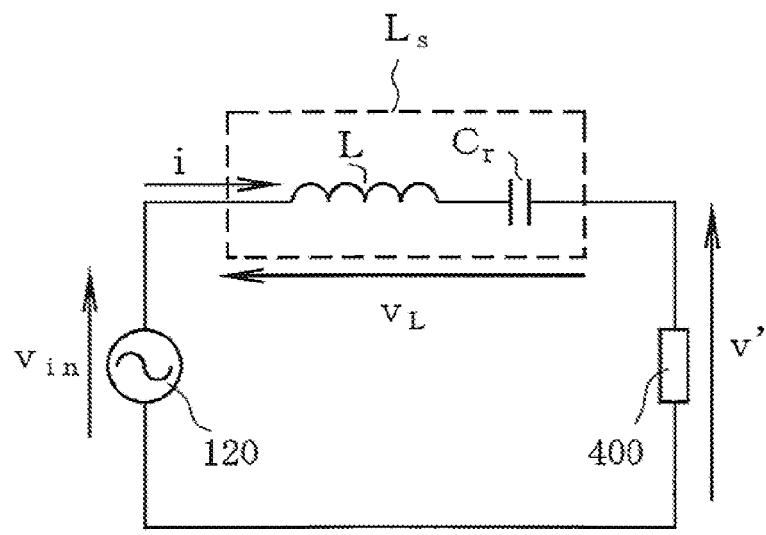
FIG. 32 is an input side equivalent circuit of the power receiving circuit illustrated in FIG. 30.
Figure 33:
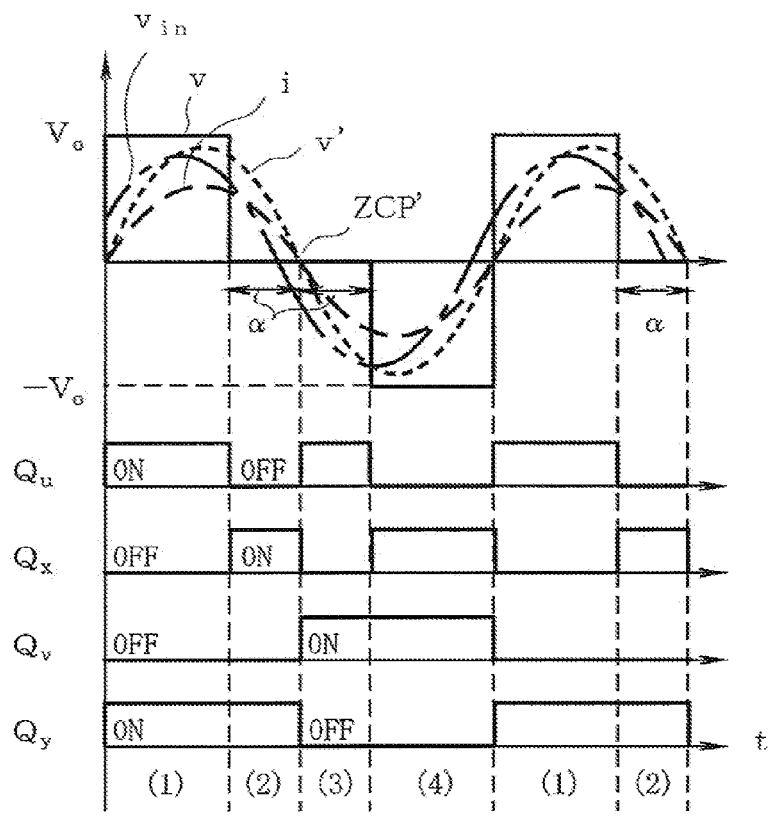
FIG. 33 is a diagram explaining the operation of the earlier application invention illustrated in FIG. 30.

The non-contact power supply device illustrated in FIG. 1 is configured in a similar way as in FIG. 30. That is, the power receiving circuit 320 includes semiconductor switches $Q_u$, $Q_x$, $Q_v$, $Q_y$, diodes $D_u$, $D_x$, $D_v$, $D_y$, and the smoothing capacitor $C_0$. The semiconductor switches $Q_u$, $Q_x$, $Q_v$, $Q_y$ are bridge-connected. The diodes $D_u$, $D_x$, $D_v$, $D_y$ are respectively connected in an inverse-parallel manner to the respective switches. The smoothing capacitor $C_0$ is connected between DC terminals of a bridge circuit formed by these elements. Between AC terminals of the bridge circuit, a series circuit of a resonance capacitor $C_r$ and a power receiving coil 120 is connected, and to the both ends of the smoothing capacitor $C_0$, a load R is connected. 100 is a high frequency power source, 110 is a primary side power supply line.

Meanwhile, the control device 200 generates and output a driving signal of the switches $Q_u$, $Q_x$, $Q_v$, $Q_y$, based on the voltage $V_o$ between DC terminals and the current i of the power receiving coil 120 detected by a current detecting unit CT.

Figure 2:
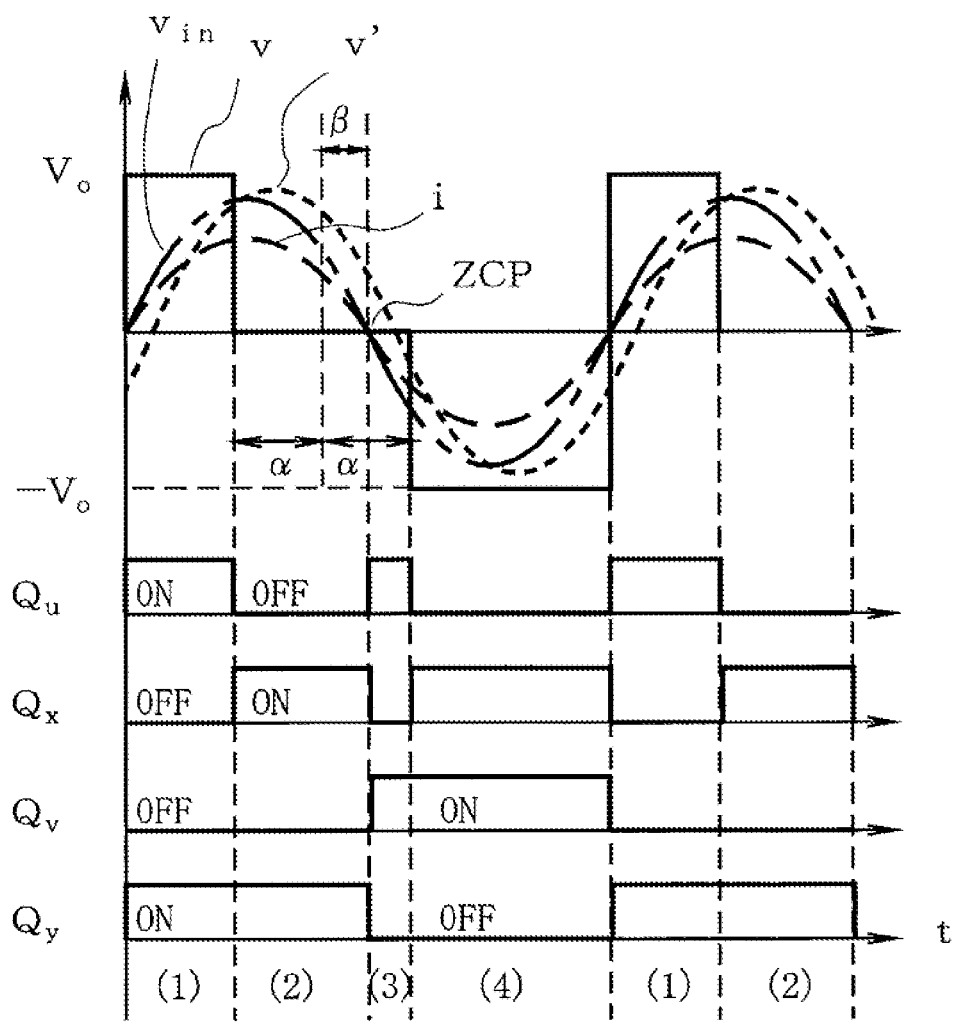
FIG. 2 is an operating waveform diagram of the first embodiment for the power supply device in FIG. 1.
Figure 3:
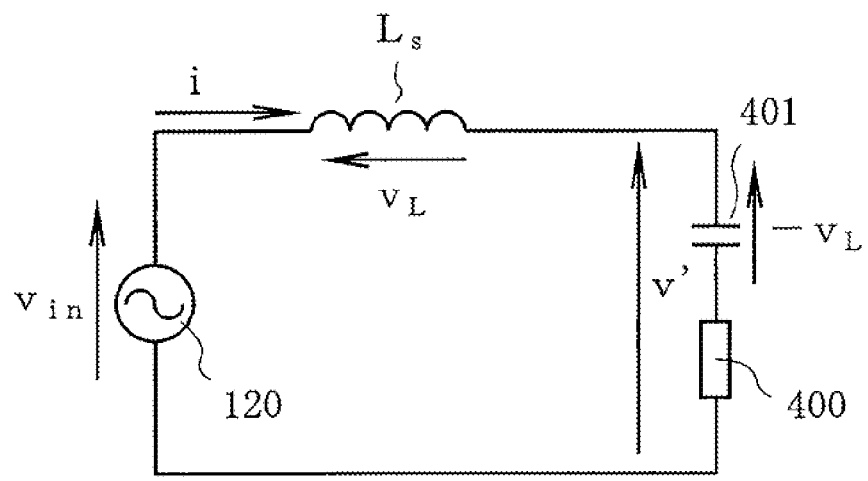
FIG. 3 is an input side equivalent circuit diagram of a power receiving circuit in FIG. 1.

Next, based on FIG. 2, FIG. 3, the input power factor improving effect of the first embodiment corresponding to claim 1 is explained.

FIG. 2 illustrates the operating waveforms of the current i flowing in the power receiving coil 120 in FIG. 1, the induced voltage $v_{in}$ of the power receiving coil 120, the voltage v between AC terminals of the bridge circuit, and the fundamental wave component v' of the voltage v between AC terminals of the bridge circuit, and driving signals of the switches $Q_u$, $Q_x$, $Q_v$, $Q_y$.

Meanwhile, FIG. 3 is an input side equivalent circuit of the power receiving circuit 320 at this time, and in the same manner as the description above, the numeral 400 represents the impedance corresponding to the power receiving circuit 320 and the load R. However, generally, with respect to the load R, other impedances may be ignored, and therefore, the numeral 400 may be regarded as a pure resistance corresponding to the load R.

In this example, the control device 200 gives driving signals to the switches $Q_u$, $Q_x$, $Q_v$, $Q_y$ so that the middle point of the period in which the peak value of v becomes zero is shifted from one of the zero crossing points ZCP in one cycle of the current i just by a compensation period (angle) β. Accordingly, the input power factor of the power receiving circuit 320 is improved. According to the driving signal, the waveform of v becomes zero voltage in the periods (assumed as α respectively) before and after the middle point mentioned above, and becomes a positive-negative voltage whose peak value is the voltage $V_o$ between DC terminals in other periods, and v becomes an asymmetric waveform with the zero crossing point ZCP of i as the center. Therefore, the phase of v' deviates from the phase of i. At this time, as illustrated in FIG. 3, when β is given so that the voltage drop by the capacitive reactance component 401 of v' compensates the voltage drop $v_L$ in $L_s$, the apparent impedance of the circuit becomes the pure resistance only. Therefore, since the phases of i and $v_{in}$ match, the input power factor of the power receiving circuit 320 may be made to be 1.

Next, how to obtain the period β to make the input power factor 1 is explained.

First, v' is expressed as in the expression (4) by Fourier series expansion.

$$v'(\omega t) = a_1 \cos(\omega t) + b_1 \sin(\omega t) \quad (4)$$

From FIG. 2, $a_1$, $b_1$ are obtained as in the expressions (5), (6), respectively.

$$a_1 = \frac{1}{\pi} \int_0^{2\pi} v(\omega t) \cos(\omega t) d\omega t \quad (5)$$

$$= \frac{1}{\pi} \int_0^{\pi-(\alpha-\beta)} V \cos(\omega t) d\omega t + \frac{1}{\pi} \int_{\pi+(\alpha+\beta)}^{2\pi} (-V) \cos(\omega t) d\omega t$$

$$= \frac{V}{\pi} \{\sin(\alpha-\beta) - \sin(\alpha+\beta)\}$$

$$= -\frac{2V}{\pi} \cos\alpha \sin\beta$$

-continued $$b_1 = \frac{1}{\pi} \int_0^{2\pi} V(\omega t) \sin(\omega t) d\omega t \quad (6)$$

$$= \frac{1}{\pi} \int_0^{\pi-(\alpha-\beta)} V \cos(\omega t) d\omega t + \frac{1}{\pi} \int_{\pi+(\alpha+\beta)}^{2\pi} (-V) \cos(\omega t) d\omega t$$

$$= \frac{V}{\pi} \{2 + \cos(\alpha-\beta) + \cos(\alpha+\beta)\}$$

$$= \frac{2V}{\pi}(1 + \cos\alpha \cos\beta)$$

Meanwhile, from FIG. 3, v' may also be expressed as in the expression (7).

$$v'(\omega t) = v_{in}(\omega t) - v_L(\omega t) \quad (7)$$

When the input power factor is made to be 1, the phases of i and $v_{in}$ match, and therefore, assuming $i_{in}(\omega t) = I_{in} \sin(\omega t)$, $v_{in}(\omega t) = V_{in} \sin(\omega t)$ is established. Therefore, the expression (7) may be expressed as the expression (8).

$$v'(\omega t) = V_{in} \sin(\omega t) - j\omega L_s I \sin(\omega t) \quad (8)$$

$$= -\omega L_s I \cos(\omega t) + V_{in} \sin(\omega t)$$

Putting $V_L = \omega L_s I$, from the expressions (4) through (6), (8), the expressions (9), (10) are established.

$$a_1 = -\frac{2V}{\pi} \cos\alpha \sin\beta = -V_L \quad (9)$$

$$b_1 = \frac{2V}{\pi}(1 + \cos\alpha \cos\beta) = V_{in} \quad (10)$$

Therefore, β and α at the time of making the input power factor 1 are obtained by the expressions (11), (12), respectively.

$$\beta = \tan^{-1}\left(-\frac{V_L}{\frac{2V}{\pi} - V_{in}}\right) \quad (11)$$

$$\alpha = \cos^{-1}\left(\frac{\pi V_L}{2V \sin\beta}\right) \quad (12)$$

That is, even in a case in which the power source frequency and the resonance frequency do not match and $L_s \neq 0$, the switches $Q_u$, $Q_x$, $Q_v$, $Q_y$ are driven by driving signals calculated using α, β from the expressions (11), (12) by the control device 200. By performing the driving by the driving signals, the control by which the power receiving circuit 320 is made to be 1 may be performed.

Meanwhile, in a case in which the influence of other impedances is large and the numeral 400 in FIG. 3 may not be regarded as the pure resistance, such as when the wiring inductance is large, the period β is given so as to compensate the reactance component included in the numeral 400 as well. Accordingly, the input power factor may be made to be 1. The way of giving the period β in a case in which the numeral 400 may not be regarded as the pure resistance as described above is the same others, the second example and the third example.

Figure 4:
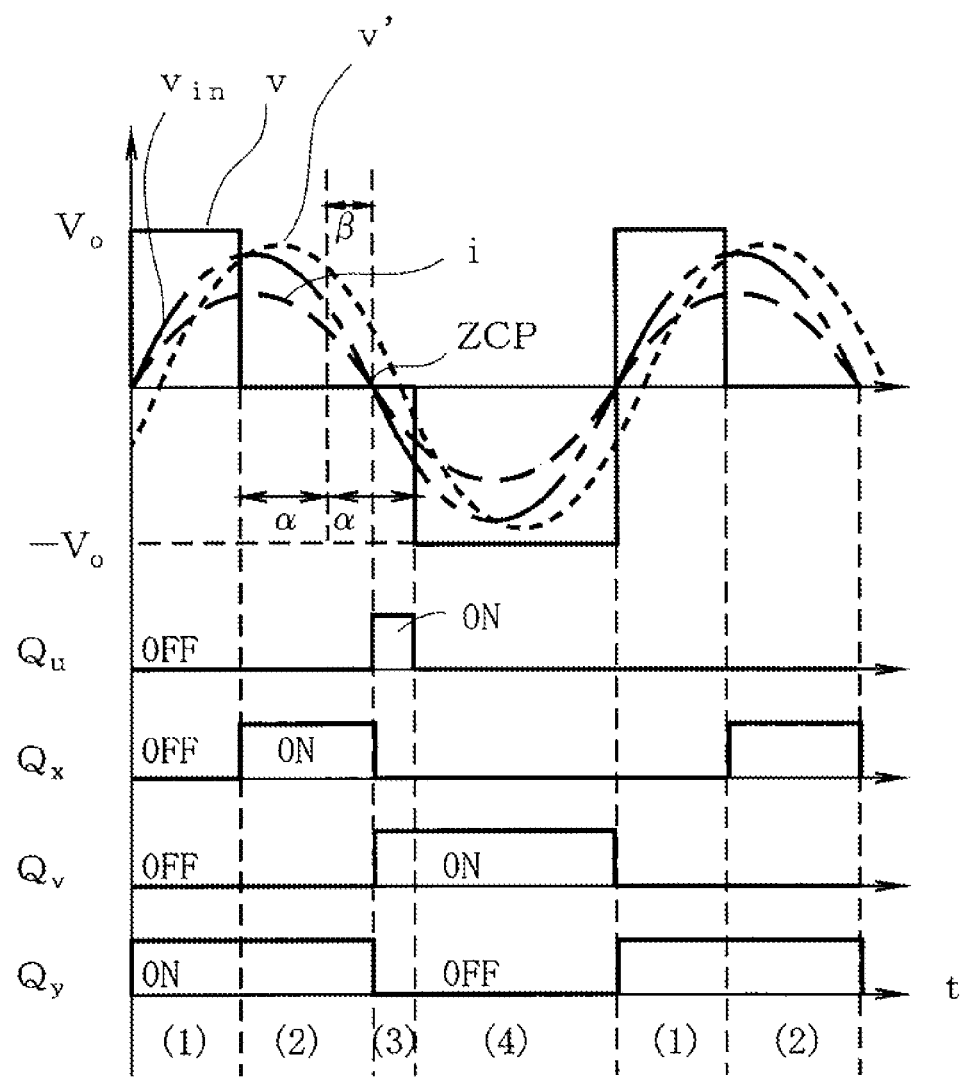
FIG. 4 is a operating waveform diagram of the first embodiment for the power supply device in FIG. 1.
Figure 6:
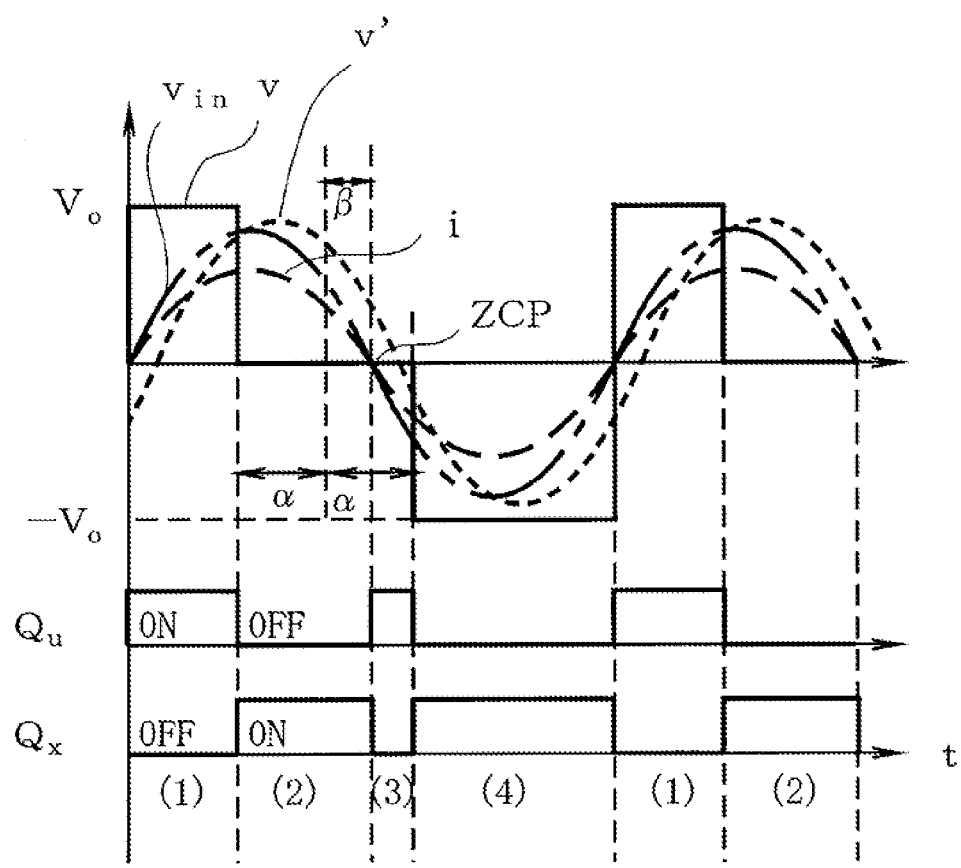
FIG. 6 is an operating waveform diagram of the first embodiment for the power supply device in FIG. 5.
Figure 7:
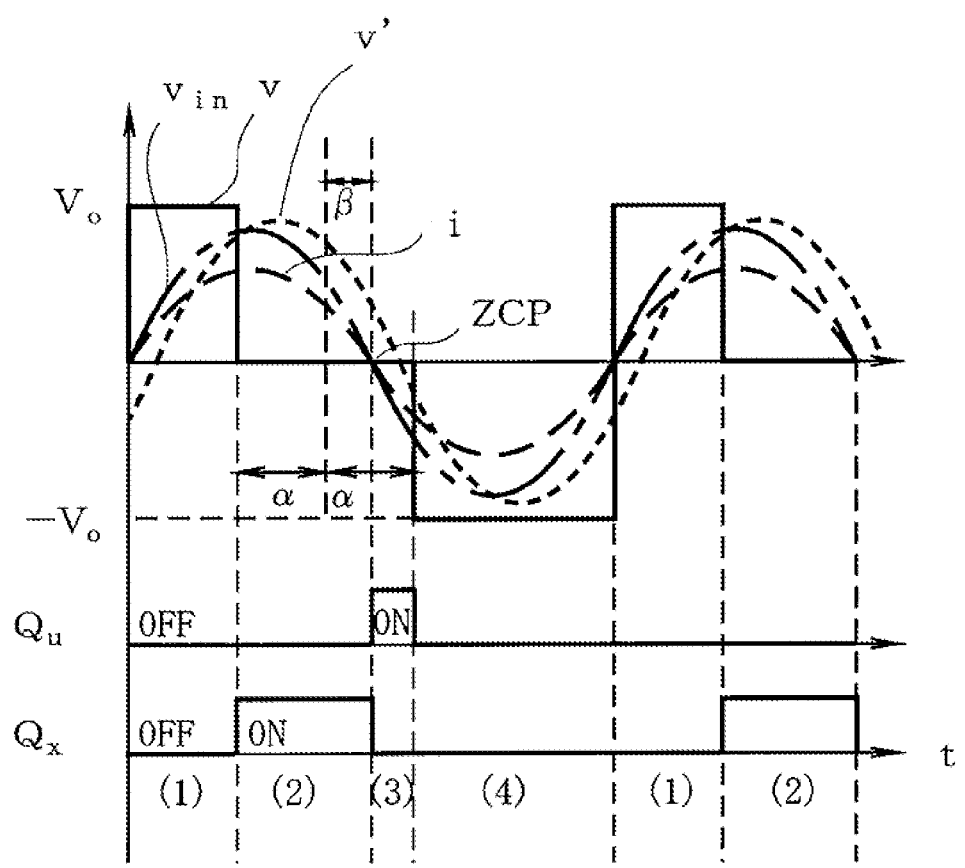
FIG. 7 is an operating waveform diagram of the first embodiment for the power supply device in FIG. 5.
Figure 9:
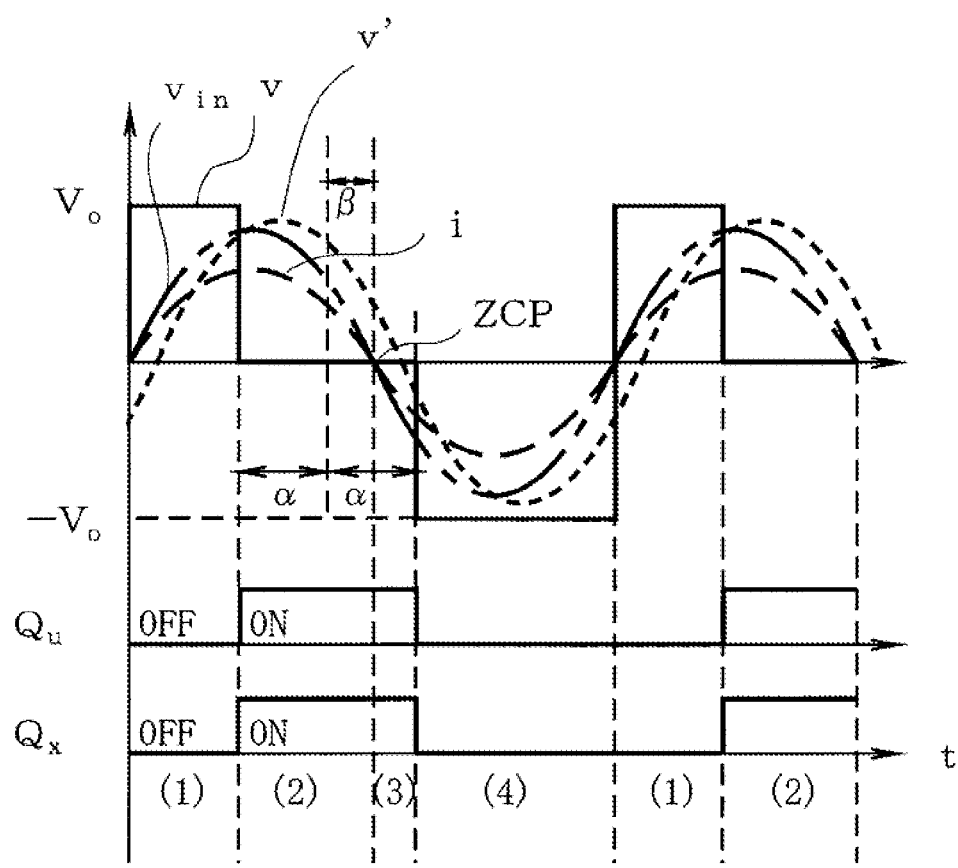
FIG. 9 is an operating waveform diagram of the first embodiment for the power supply device in FIG. 5.
Figure 13:
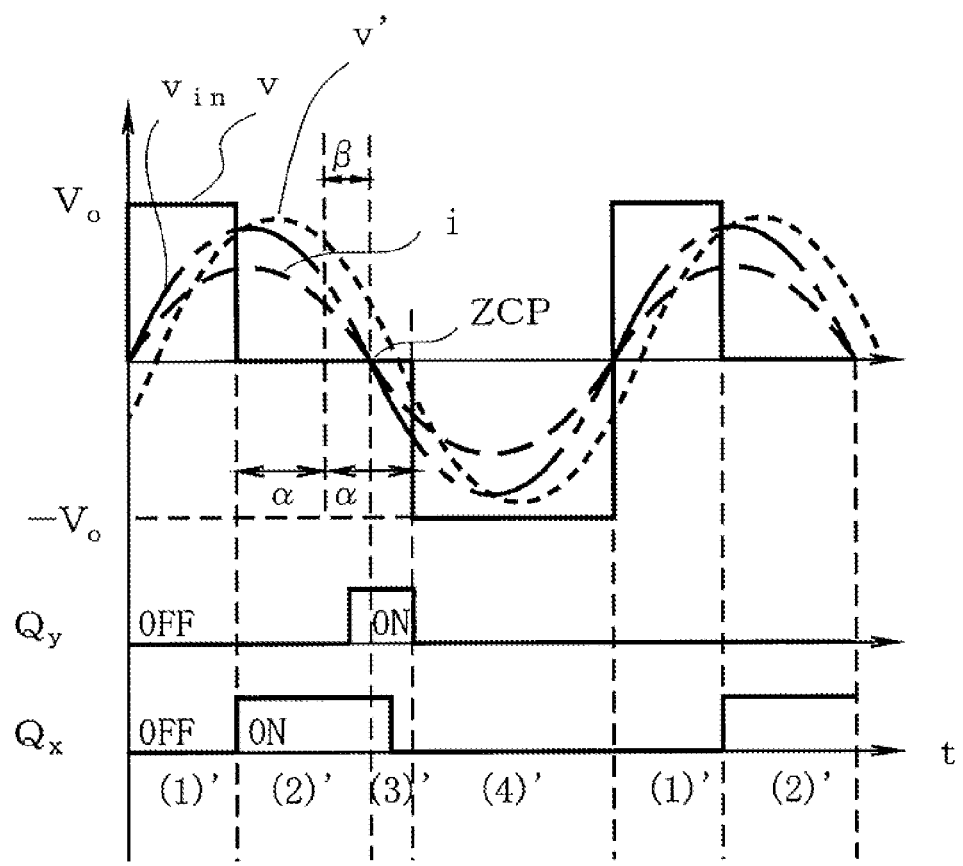
FIG. 13 is an operating waveform diagram of the first embodiment for the power supply device in FIG. 10.

In addition, of v is the same as in FIG. 2, the driving signals of the switches $Q_u$, $Q_x$, $Q_v$, $Q_y$ may be as in FIG. 4 for example. In this case, by driving the switches $Q_u$, $Q_x$, $Q_v$, $Q_y$, applying α, β of the expressions (11), (12), the input power factor of the power receiving circuit 320 may be made to be 1 as well.

Next, FIG. 5 is a circuit diagram illustrating the second example of the present invention. Regarding this non-contact power supply device, the control by which the input power factor of the power receiving circuit 330 is made to be 1 may be performed as well by the first embodiment corresponding to claim 1.

The power receiving circuit 330 in FIG. 5 includes a switching arm series circuit in which a switching arm in which a diode $D_u$ is connected to a semiconductor switch $Q_u$ in an inverse-parallel manner and a switching arm in which a diode $D_x$ is connected to a semiconductor switch $Q_x$ in an inverse-parallel manner are connected in series. In the power receiving circuit 330 in FIG. 5, a bridge circuit is configured by the parallel connection of this switching arm series circuit and a diode series circuit in which diodes $D_v$, $D_y$ are connected in series. In addition, to one of the DC terminals (the positive-side DC terminal) of the bridge circuit, the anode of a diode $D_0$ is connected. Between the cathode of the diode $D_0$ and the other of the DC terminals (the negative-side DC terminal) of the bridge circuit, a smoothing capacitor $C_0$ is connected. Other parts are the same as FIG. 1.

FIG. 6 through FIG. 9 illustrate the operating waveforms of the current i flowing in the power receiving coil 120 in FIG. 5, the induced voltage $v_{in}$ of the power receiving coil 120, the voltage v between AC terminals of the bridge circuit and the fundamental wave component v' of the voltage v between AC terminals, and driving signals of the switches $Q_u$, $Q_x$.

In the non-contact power supply device in FIG. 5, when the waveform of v is the same as in FIG. 2, the driving signals of the switches $Q_u$, $Q_x$ may be as in FIG. 6 through FIG. 9, for example. In this case, by driving the switches $Q_u$, $Q_x$ applying α, β of the expressions (11), (12), the input power factor of the power receiving circuit 330 may be made to be 1 as well.

FIG. 10 is a circuit diagram illustrating the third example of a power supply device according to the present embodiment. As described in claim 2, in a case in which the first example is applied to a power supply device in FIG. 10, the control by which a power receiving circuit 340 is made to be 1 may be performed as well.

In the power receiving circuit 340 in FIG. 10, a bridge circuit is configured by the parallel connection of a series circuit of a switching arm in which a diode $D_x$ is connected to a semiconductor switch $Q_x$ in an inverse-parallel manner and a diode $D_u$, and a series circuit of a switching arm in which a diode $D_y$ is connected to a semiconductor switch $Q_y$ in an inverse-parallel manner and a diode $D_v$. Other parts are the same as FIG. 1.

FIG. 11 through FIG. 14 illustrate the operating waveforms of the current i flowing in the power receiving coil 120 in FIG. 10, the induced voltage $v_{in}$ of the power receiving coil 120, the voltage v between AC terminals of the bridge circuit and the fundamental wave component v' of the voltage v between AC terminals, and driving signals of the switches $Q_y$, $Q_x$. FIG. 11 through FIG. 14 are identical to FIG. 6 through FIG. 9 with a replacement of the driving signal of the switch $Q_u$ with the switch $Q_y$.

In the non-contact power supply device in FIG. 10, when the waveform of v is the same as in FIG. 2, the driving signals of the switches $Q_y$, $Q_x$ may be as in FIG. 11 through FIG. 14, for example. In this case, by driving the switches $Q_y$, $Q_x$ applying α, β of the expressions (11), (12), the input power factor of the power receiving circuit 340 may be made to be 1 as well.

Next, the input power factor improving effect of the second example corresponding to claim 3 is explained.

Figure 15:
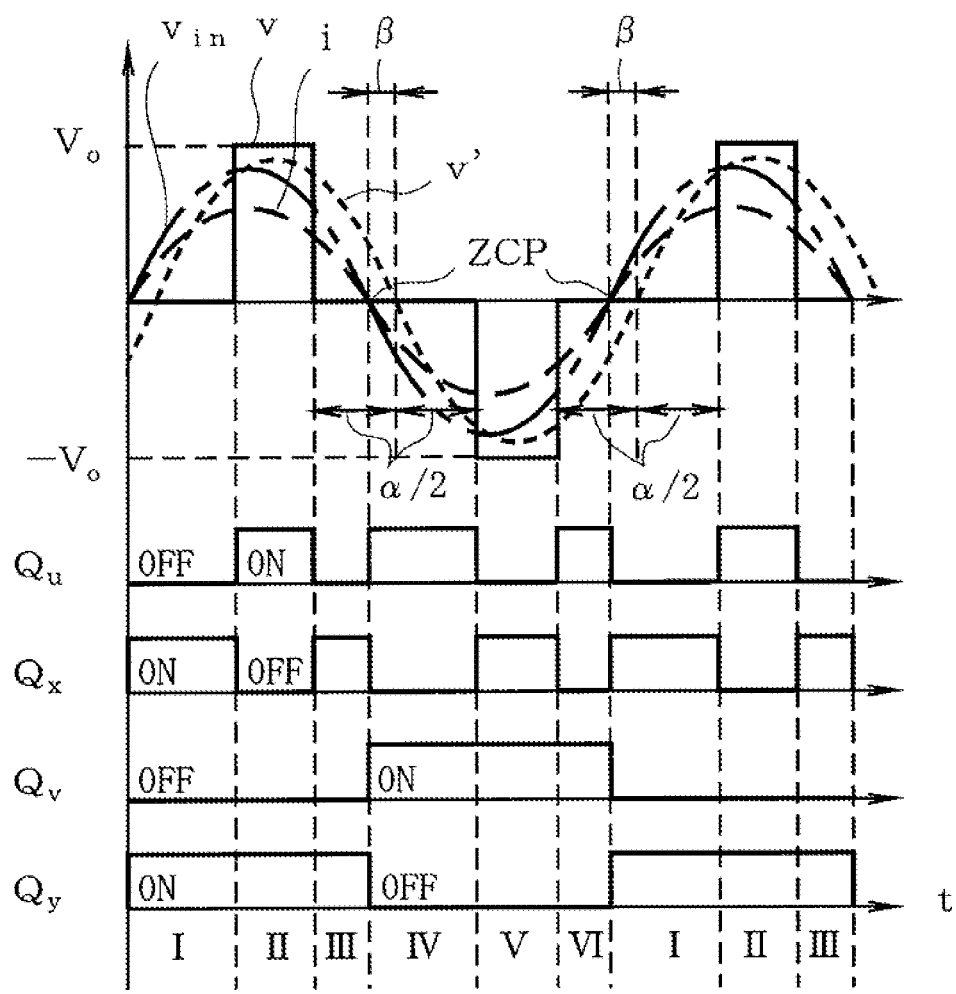
FIG. 15 is an operating waveform diagram of the second embodiment for the power supply device in FIG. 1.

FIG. 15 illustrates the operating waveforms of the current i flowing in the power receiving coil 120 in FIG. 1, the induced voltage $v_{in}$ of the power receiving coil 120, the voltage v between AC terminals of the bridge circuit and the fundamental wave component v' of the voltage v between AC terminals, and driving signals of the switches $Q_u$, $Q_x$, $Q_v$, $Q_y$. The input side equivalent circuit of the power receiving circuit 320 is the same as in FIG. 3.

In this example, in order to improve the input power factor of the power receiving circuit 320, the control device 200 gives driving signals to the switches $Q_u$, $Q_x$, $Q_v$, $Q_y$, so that the middle point of the period in which the peak value of v becomes zero is shifted from both of the zero crossing points ZCP in one cycle of the current i just by a compensation period (angle) β respectively.

According to the driving signal, the waveform of v becomes zero voltage in the periods (assumed as α/2 respectively) before and after the middle point mentioned above, and becomes a positive-negative voltage whose peak value is the voltage $V_o$ between DC terminals in other periods, and v becomes an asymmetric waveform with the zero crossing point ZCP of i as the center. Therefore, the phase of v' deviates from the phase of i. At this time, as illustrated in FIG. 3, when β is given so that the voltage drop by the capacitive reactance component 401 v' compensates the voltage drop $v_L$ in $L_s$, the apparent impedance of the circuit becomes the pure resistance only. Therefore, since the phases of i and $v_{in}$ match, the input power factor of the power receiving circuit 320 may be made to be 1.

Next, how to obtain the period β to make the input power factor 1 is explained. In the same manner as in the first example, v' is expressed by the expression (4). In addition, from FIG. 15, $a_1$, $b_1$ are obtained by the expressions (13), (14), respectively.

$$a_1 = \frac{1}{\pi} \int_0^{2\pi} v(\omega t) \cos(\omega t) d\omega t \qquad (13)$$
$$= \frac{1}{\pi} \left\{ \int_{\beta+\alpha/2}^{\pi+\beta-\alpha/2} V \cos(\omega t) d\omega t - \frac{1}{\pi} \int_{\pi+\beta+\alpha/2}^{2\pi+\beta-\alpha/2} V \cos(\omega t) d\omega t \right\}$$
$$= -\frac{4V}{\pi} \sin\frac{\alpha}{2} \sin\beta$$

$$b_1 = \frac{1}{\pi} \int_0^{2\pi} v(\omega t) \sin(\omega t) d\omega t \qquad (14)$$
$$= \frac{1}{\pi} \left\{ \int_{\beta+\alpha/2}^{\pi+\beta-\alpha/2} V \sin(\omega t) d\omega t - \int_{\pi+\beta+\alpha/2}^{2\pi+\beta-\alpha/2} V \sin(\omega t) d\omega t \right\}$$
$$= \frac{4V}{\pi} \cos\frac{\alpha}{2} \cos\beta$$

In the same manner as in the first example, from the expressions (4), (8), (13), (14), β and α at the time of making the input power factor 1 are obtained as in the expressions (15), (16), respectively.

$$\beta = \tan^{-1}\left(-\frac{V_L}{V_{in}}\right) \qquad (15)$$

$$\alpha = 2\cos^{-1}\left(\frac{\pi V_L}{4V \sin\beta}\right) \qquad (16)$$

Therefore, even in a case of $L_s \neq 0$, by driving the switches $Q_u$, $Q_x$, $Q_v$, $Q_y$, by driving signals calculated using α, β from the expressions (15), (16) by the control device 200, the input power factor of the power receiving circuit 320 is made to be 1.

Figure 16:
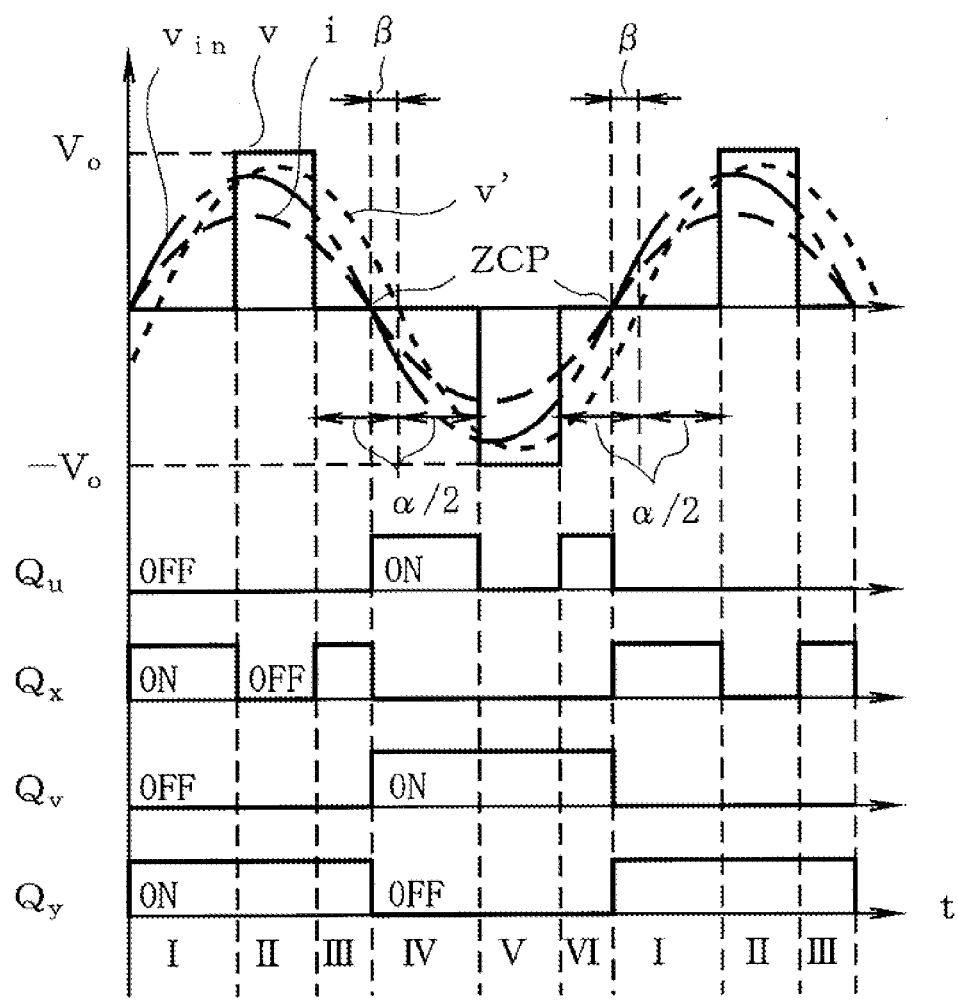
FIG. 16 is an operating waveform diagram of the second embodiment for the power supply device in FIG. 1.

Meanwhile, when the waveform of v is the same as in FIG. 15, the driving signals of the switches $Q_u$, $Q_x$, $Q_v$, $Q_y$ may be as in FIG. 16, for example. In this case, by driving the switches $Q_u$, $Q_x$, $Q_v$, $Q_y$ applying α, β of the expressions (15), (16), the input power factor of the power receiving circuit 320 may be made to be 1 as well.

Furthermore, FIG. 17 is a circuit diagram illustrating the fourth example of a power supply device according to the present invention, and the second example may be applied to a non-contact power supply device in FIG. 17.

A power receiving circuit 350 includes a switching arm series circuit in which a switching arm in which a diode $D_u$ is connected to a semiconductor switch $Q_u$ in an inverse-parallel manner and a switching arm in which a diode $D_x$ is connected to a semiconductor switch $Q_x$ in an inverse-parallel manner are connected in series. In the power receiving circuit 350 in FIG. 17, a bridge circuit is configured by the parallel connection of this switching arm series circuit and a diode series circuit in which diodes $D_v$, $D_y$ are connected in series. Other parts are the same as FIG. 1. The power receiving circuit 350 corresponding to the power receiving circuit 330 from which the diode $D_0$ is eliminated.

Figure 18:
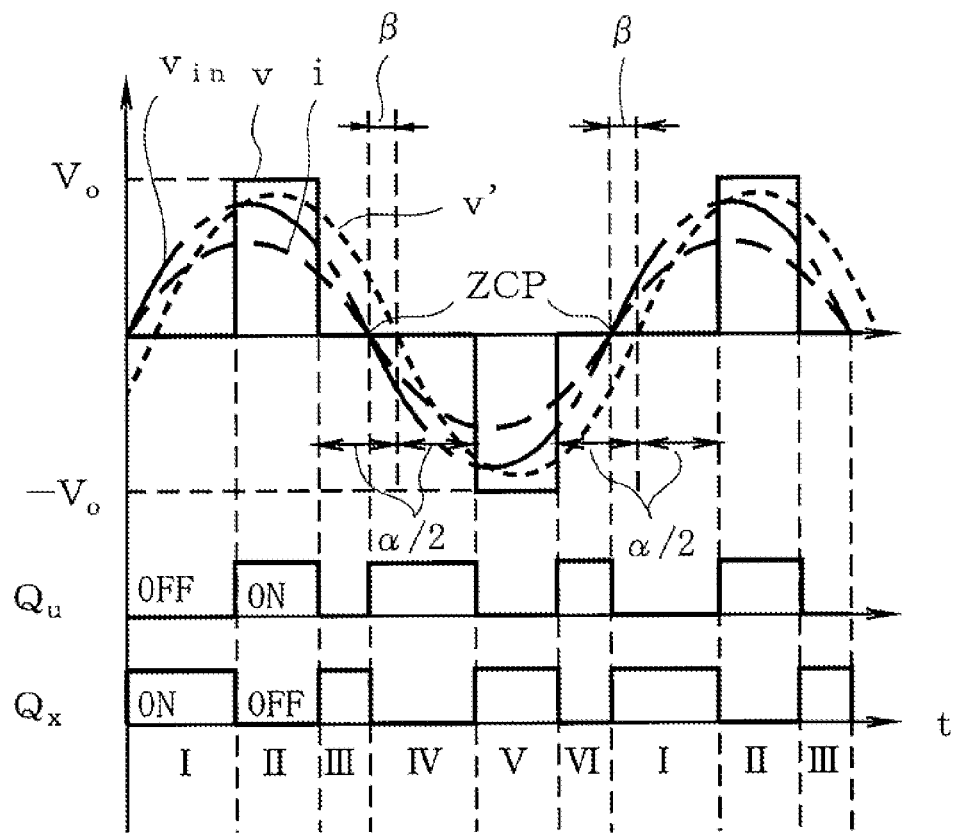
FIG. 18 is an operating waveform diagram of the second embodiment for the power supply device in FIG. 17.
Figure 19:
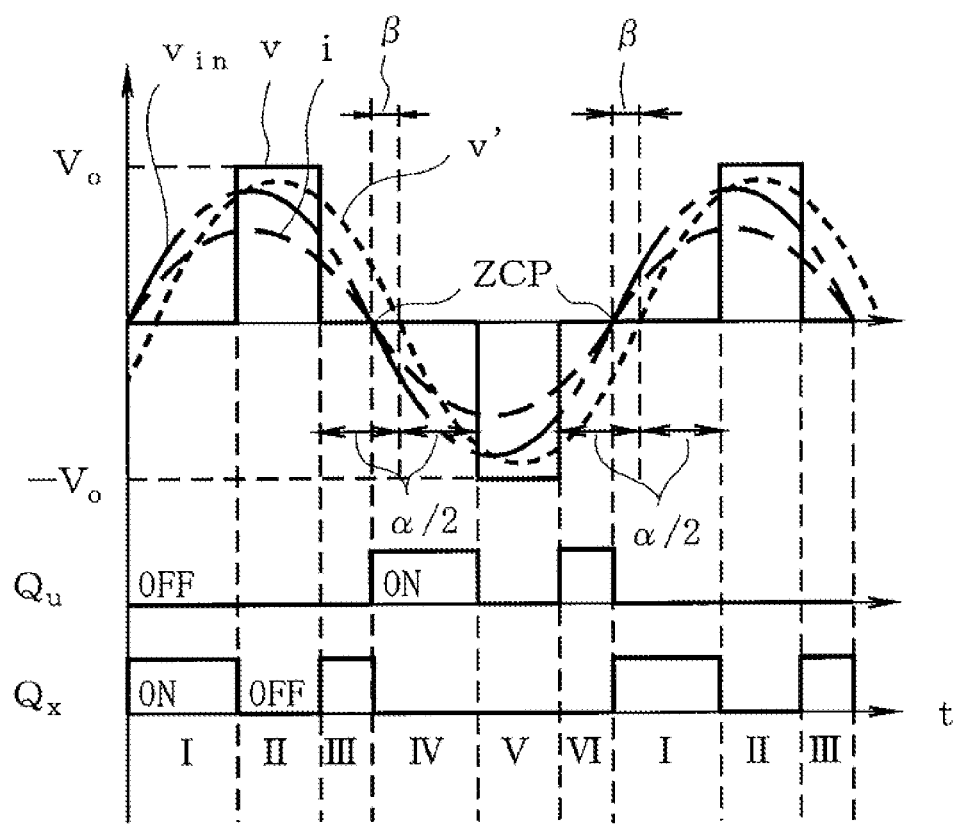
FIG. 19 is an operating waveform diagram of the second embodiment for the power supply device in FIG. 17.

FIG. 18, FIG. 19 illustrate the operating waveforms of the current i flowing in the power receiving coil 120 in FIG. 17, the induced voltage $v_{in}$ of the power receiving coil 120, the voltage v between AC terminals of the bridge circuit and the fundamental wave component v' of the voltage v between AC terminals, and driving signals of the switches $Q_u$, $Q_x$.

In the non-contact power supply device in FIG. 17, when the waveform of v is the same as in FIG. 15, the driving signals of the switches $Q_u$, $Q_x$ may be as in FIG. 18, FIG. 19, for example. In this case, by driving the switches $Q_u$, $Q_x$ applying α, β of the expressions (15), (16), the input power factor of the power receiving circuit 350 may be made to be 1 as well.

In addition, as presented in claim 4, it is also possible to apply the second example to the non-contact power supply device in FIG. 10.

Figure 20:
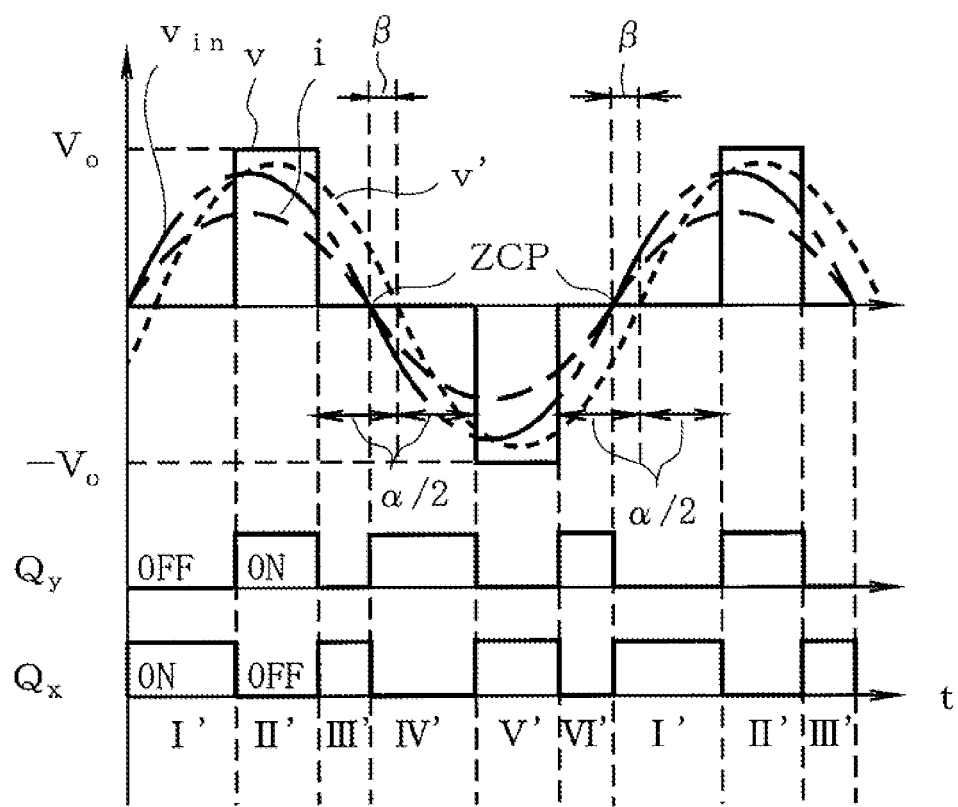
FIG. 20 is an operating waveform diagram of the second embodiment for the power supply device in FIG. 10.
Figure 21:
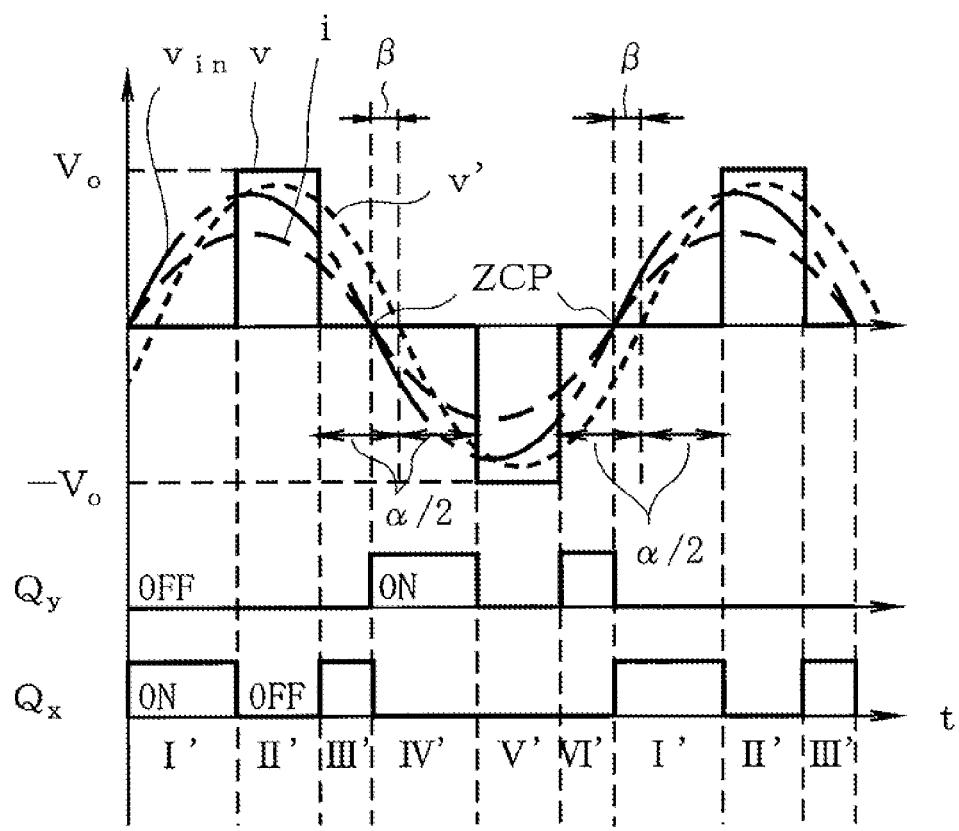
FIG. 21 is an operating waveform diagram of the second embodiment for the power supply device in FIG. 10.
Figure 23:
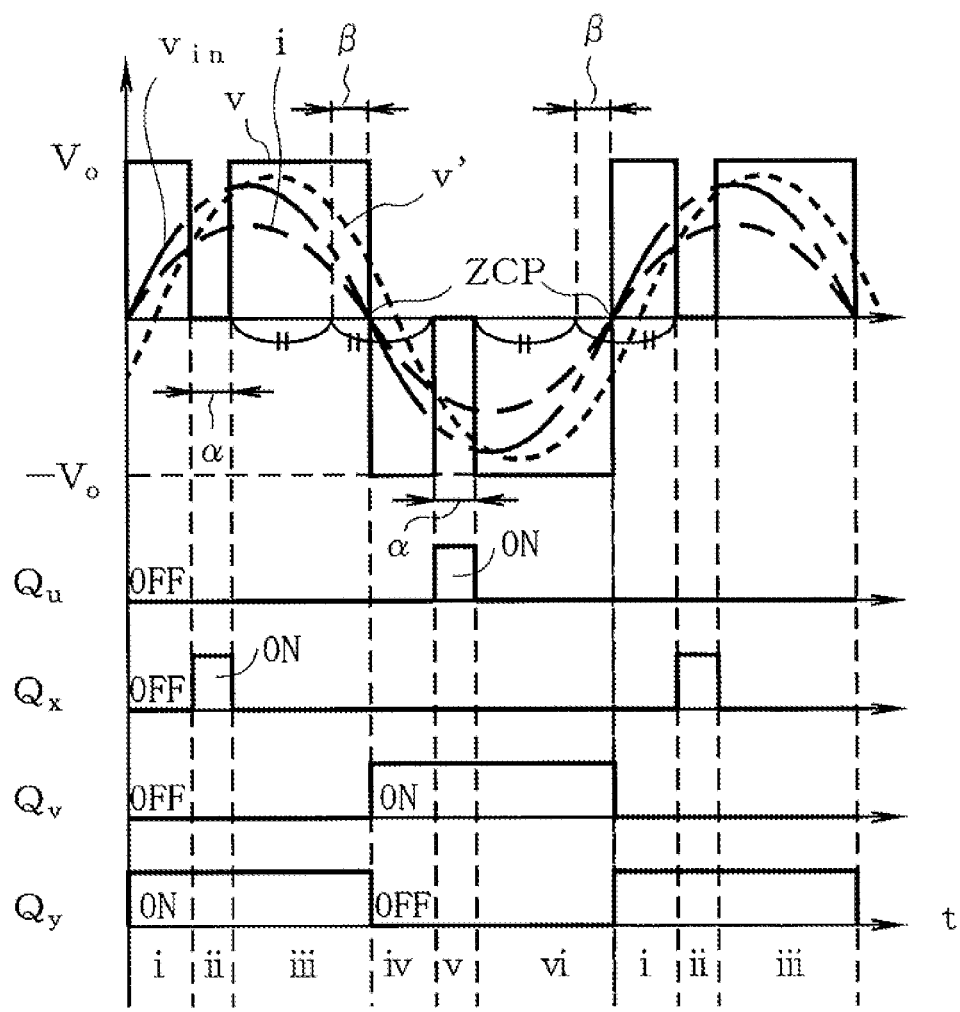
FIG. 23 is an operating waveform diagram of the third embodiment for the power supply device in FIG. 1.

FIG. 20, FIG. 21 illustrate the operating waveforms of the current i flowing in the power receiving coil 120 in FIG. 10, the induced voltage $v_{in}$ of the power receiving coil 120, the voltage v between AC terminals of the bridge circuit and the fundamental wave component v' of the voltage v between AC terminals, and driving signals of the switches $Q_y$, $Q_x$. FIG. 20, FIG. 21 are identical to FIG. 18, FIG. 19 with a replacement of the driving signal of the switch $Q_u$ with the switch $Q_y$.

In the non-contact power supply device in FIG. 10, when the waveform of v is the same as in FIG. 15, the driving signals of the switches $Q_y$, $Q_x$ may be as in FIG. 20, FIG. 21, for example. In this case, by driving the switches $Q_y$, $Q_x$ applying α, β of the expressions (15), (16), the input power factor of the power receiving circuit 340 may be made to be 1 as well.

Next, the power factor improving effect of the third example corresponding to claim 5 is explained.

FIG. 22 illustrates the operating waveforms of the current i flowing in the power receiving coil 120 in FIG. 1, the induced voltage $v_{in}$ of the power receiving coil 120, the voltage v between AC terminals of the bridge circuit and the fundamental wave component v' of the voltage v between AC terminals, and driving signals of the switches $Q_u$, $Q_x$, $Q_v$, $Q_y$. The input side equivalent circuit of the power receiving circuit 320 is the same as in FIG. 3.

In the third example, the control device 200 gives driving signals to the switches $Q_u$, $Q_x$, $Q_v$, $Q_y$ so that the middle point of the period between periods α in which the peak value of v becomes zero in one cycle of the current i is shifted from two zero crossing points ZCP in one cycle of the current i respectively just by a compensation period (angle) β. Accordingly, the input power factor of the power receiving circuit 320 is improved. According to the driving signal, the waveform of v becomes a positive-negative voltage whose peak value is the voltage $V_o$ between DC terminals in the periods before and after the middle point mentioned above, and becomes zero voltage in other periods, being an asymmetric waveform with the zero crossing point ZCP of i as the center. Therefore, the phase of v' deviates from the phase of i. At this time, as illustrated in FIG. 3, when β is given so that the voltage drop by the capacitive reactance component 401 v' compensates the voltage drop $v_L$ in $L_s$, the apparent impedance of the circuit becomes the pure resistance only. Therefore, since the phases of i and $v_{in}$ match, the input power factor of the power receiving circuit 320 may be made to be 1.

Next, how to obtain the period β to make the input power factor 1 is explained.

In the same manner as in the first example, v' is expressed by the expression (4). In addition, from FIG. 22, $a_1$, $b_1$ are obtained by the expressions (17), (18), respectively.

$$a_1 = \frac{1}{\pi} \int_0^{2\pi} v(\omega t)\cos(\omega t)\,d\omega t \quad (17)$$

$$= \frac{1}{\pi}\left\{ \int_0^{\pi/2+\beta-\alpha/2} V\cos(\omega t)d\omega t + \int_{\pi/2+\beta+\alpha/2}^{\pi} V\cos(\omega t)d\omega t - \int_{\pi}^{3\pi/2+\beta-\alpha/2} V\cos(\omega t)d\omega t - \int_{3\pi/2+\beta+\alpha/2}^{2\pi} V\cos(\omega t)d\omega t \right\}$$

$$= \frac{4V}{\pi}\sin\frac{\alpha}{2}\sin\beta$$

$$b_1 = \frac{1}{\pi}\int_0^{2\pi} v(\omega t)\sin(\omega t)\,d\omega t \quad (18)$$

$$= \frac{1}{\pi}\left\{ \int_0^{\pi/2+\beta-\alpha/2} V\sin(\omega t)d\omega t + \int_{\pi/2+\beta+\alpha/2}^{\pi} V\sin(\omega t)d\omega t - \int_{\pi}^{3\pi/2+\beta-\alpha/2} V\sin(\omega t)d\omega t - \int_{3\pi/2+\beta+\alpha/2}^{2\pi} V\cos(\omega t)d\omega t \right\}$$

$$= \frac{4V}{\pi}\left(1 - \sin\frac{\alpha}{2}\cos\beta\right)$$

In the same manner as in the first example, from the expressions (4), (8), (17), (18), β and α at the time of making the input power factor 1 are obtained as in the expressions (19), (20), respectively.

$$\beta = \tan^{-1}\left(\frac{-V_L}{\frac{4V}{\pi} - V_{in}}\right) \quad (19)$$

$$\alpha = 2\sin^{-1}\left(\frac{-V_L \pi}{4V\sin\beta}\right) \quad (20)$$

Therefore, even in a case of $L_s \neq 0$, the switches $Q_u$, $Q_x$, $Q_v$, $Q_y$ are driven by driving signals calculated using α, β from the expressions (19), (20) by the control device 200. By performing the driving by the driving signals, the input power factor of the power receiving circuit 320 may be made to be 1.

In a similar manner, it is also possible to apply the third example to the non-contact power supply device illustrated in FIG. 17.

Figure 24:
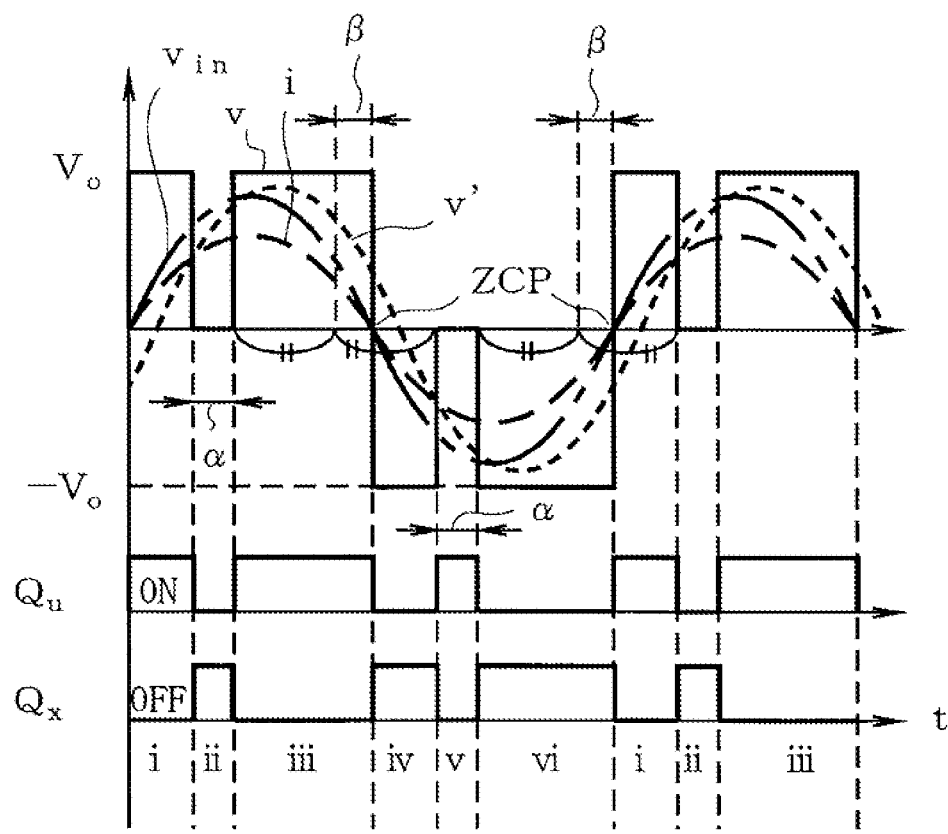
FIG. 24 is an operating waveform diagram of the third embodiment for the power supply device in FIG. 17.
Figure 28:
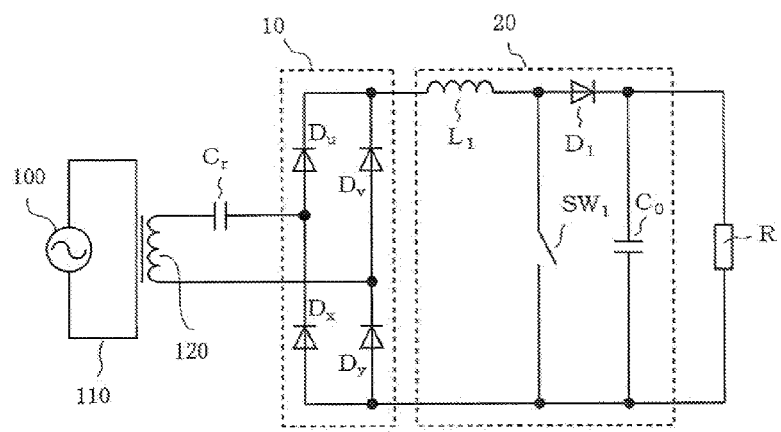
FIG. 28 is a circuit diagram of a conventional art described in Japanese Laid-open Patent Publication No. 2002-354711.
Figure 29:
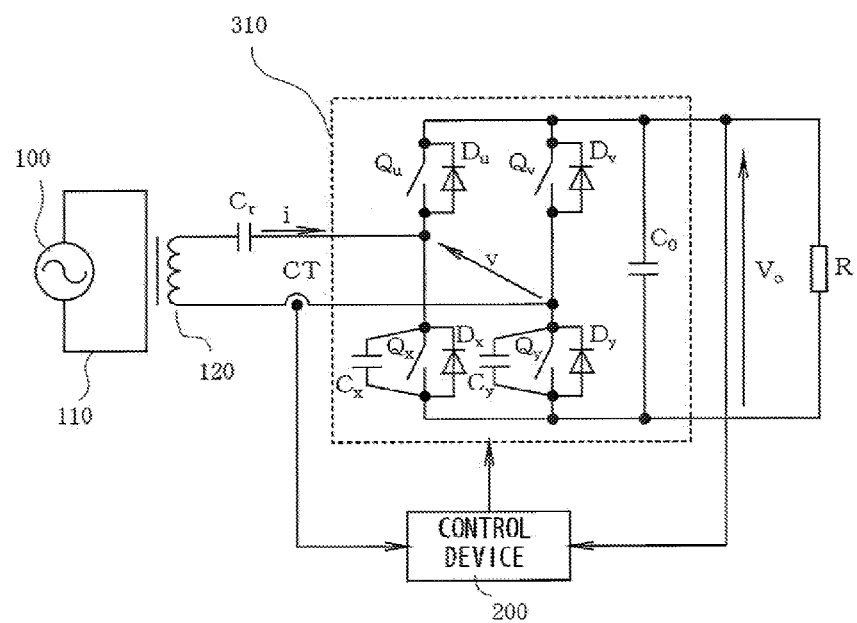
FIG. 29 is a circuit diagram of a conventional art described in Japanese Laid-open Patent Publication No. 2012-125138.

FIG. 24, FIG. 25 illustrate the operating waveforms of the current i flowing in the power receiving coil 120 in FIG. 17, the induced voltage $v_{in}$ of the power receiving coil 120, the voltage v between AC terminals of the bridge circuit and the fundamental wave component v' of the voltage v between AC terminals, and driving signals of the switches $Q_u$, $Q_x$.

In the non-contact power supply device in FIG. 17, when the waveform of v is the same as in FIG. 22, the driving signals of the switches $Q_u$, $Q_x$ may be as in FIG. 24, FIG. 25, for example. In this case, by driving the switches $Q_u$, $Q_x$ applying α, β of the expressions (19), (20), the input power factor of the power receiving circuit 350 may be made to be 1 as well.

In addition, as described in claim 6, it is also possible to apply the third example to the non-contact power supply device illustrated in FIG. 10.

FIG. 26, FIG. 27 illustrate the operating waveforms of the current i flowing in the power receiving coil 120 in FIG. 10, the induced voltage $v_{in}$ of the power receiving coil 120, the voltage v between AC terminals of the bridge circuit and the fundamental wave component v' of the voltage v between AC terminals, and driving signals of the switches $Q_y$, $Q_x$. FIG. 26, FIG. 27 are identical to FIG. 24, FIG. 25 with a replacement of the driving signal of the switch $Q_u$ with the switch $Q_y$.

In the non-contact power supply device in FIG. 10, when the waveform of v is the same as in FIG. 22, the driving signals of the switches $Q_y$, $Q_x$ may be as in FIG. 26, FIG. 27, for example. In this case, by driving the switches $Q_y$, $Q_x$ applying α, β of the expressions (19), (20), the input power factor of the power receiving circuit 340 may be made to be 1 as well.

According to the present invention, even when the resonance frequency of the resonance circuit does not match the power source frequency, it is possible to suppress the loss in the entire device by improving the input power factor of the power receiving circuit, and to make the power supply device smaller and to lower its cost.

What is claimed is:

1. A power supply device comprising:
   a power receiving coil configured to exchange power by an external magnetic coupling;
   a resonance capacitor forming a resonance circuit with the power receiving coil;
   a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including at least for one phase, a plurality of switching arm series circuits, each switching arm series circuit having two inverse-parallel connection circuits connected in series, each inverse-parallel connection circuit having a semiconductor switch and a diode connected in inverse-parallel;
   a smoothing capacitor connected between the DC terminals of the bridge circuit;
   a load connected to both ends of the smoothing capacitor;
   a current detecting unit configured to detect an input current flowing in the power receiving coil;
   a voltage detecting unit configured to detect a voltage between the DC terminals of the bridge circuit; and
   a control unit configured to perform switching of the semiconductor switch so that a voltage between the AC terminals of the bridge circuit becomes zero voltage in equal periods before and after a center point shifted from one zero crossing point in one cycle of the input current by a compensation period and becomes a positive-negative voltage whose peak value is the voltage between DC terminals in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

2. A power supply device comprising:
   a power receiving coil configured to exchange power by an external magnetic coupling;
   a resonance capacitor forming a resonance circuit with the power receiving coil;
   a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including
       two inverse-parallel connection circuits connected in series, each inverse-parallel connection circuit having a semiconductor switch and a diode connected in inverse-parallel, and
       a plurality of diodes connected in series, the two inverse-parallel connection circuits and the plurality of diodes being connected in parallel;
   a smoothing capacitor connected between the DC terminals of the bridge circuit;
   a load is connected to both ends of the smoothing capacitor;
   a current detecting unit configured to detect an input current flowing in the power receiving coil;
   a voltage detecting unit configured to detect a voltage between the DC terminals of the bridge circuit; and
   a control unit configured to perform switching of the semiconductor switch so that a voltage between the AC terminals of the bridge circuit becomes zero voltage in equal periods before and after a center point shifted from one zero crossing point in one cycle of the input current by a compensation period and becomes a positive-negative voltage whose peak value is the voltage between DC terminals in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

3. A power supply device comprising:
   a power receiving coil configured to exchange power by an external magnetic coupling;
   a resonance capacitor forming a resonance circuit with the power receiving coil;
   a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including at least for one phase, a plurality of switching arm series circuits, each switching arm series circuit having two inverse-parallel connection circuits connected in series, each inverse-parallel connection circuit having a semiconductor switch and a diode connected in inverse-parallel;

a smoothing capacitor connected between the DC terminals of the bridge circuit;

a load connected to both ends of the smoothing capacitor;

a current detecting unit configured to detect an input current flowing in the power receiving coil;

a voltage detecting unit configured to detect a voltage between the DC terminals of the bridge circuit; and a control unit configured to perform switching of the semiconductor switch so that a voltage between the AC terminals of the bridge circuit becomes zero voltage in equal periods before and after a center point shifted from respective zero crossing points in one cycle of the input current by a compensation period and becomes a positive-negative voltage whose peak value is the voltage between DC terminals in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

4. A power supply device comprising:

a power receiving coil configured to exchange power by an external magnetic coupling;

a resonance capacitor forming a resonance circuit with the power receiving coil;

a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including
   two inverse-parallel connection circuits connected in series, each inverse-parallel connection circuit having a semiconductor switch and a diode connected in inverse-parallel, and
   a plurality of diodes connected in series, the two inverse-parallel connection circuits and the plurality of diodes being connected in parallel;

a smoothing capacitor connected between the DC terminals of the bridge circuit;

a load connected to both ends of the smoothing capacitor;

a current detecting unit configured to detect an input current flowing in the power receiving coil;

a voltage detecting unit configured to detect a voltage between the DC terminals of the bridge circuit; and a control unit configured to perform switching of the semiconductor switch so that a voltage between the AC terminals of the bridge circuit becomes zero voltage in equal periods before and after a center point shifted from respective zero crossing points in one cycle of the input current by a compensation period and becomes a positive-negative voltage whose peak value is the voltage between DC terminals in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

5. A power supply device comprising:

a power receiving coil configured to exchange power by an external magnetic coupling;
   a resonance capacitor forming a resonance circuit with the power receiving coil;
   a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including at least for one phase, a plurality of switching arm series circuits, each switching arm series circuit having two inverse-parallel connection circuits connected in series, each inverse-parallel connection circuit having a semiconductor switch and a diode connected in inverse-parallel;
   a smoothing capacitor connected between the DC terminals of the bridge circuit;
   a load connected to both ends of the smoothing capacitor;
   a current detecting unit configured to detect an input current flowing in the power receiving coil;
   a voltage detecting unit configured to detect a voltage between the DC terminals of the bridge circuit; and
   a control unit configured to perform switching of the semiconductor switch so that a voltage between the AC terminals of the bridge circuit becomes a positive-negative voltage peak value is the voltage between the DC terminals in equal periods before and after a center point shifted from respective zero crossing points in one cycle of the input current by a compensation period and becomes zero voltage in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

6. A power supply device comprising:

a power receiving coil configured to exchange power by an external magnetic coupling;

a resonance capacitor forming a resonance circuit with the power receiving coil;

a bridge circuit having alternating-current (AC) terminals and direct-current (DC) terminals, one end of the power receiving coil being connected to one of the AC terminals through the resonance capacitor, and another end of the power receiving coil being connected to another of the AC terminals, the bridge circuit including
   two inverse-parallel connection circuits connected in series, each inverse-parallel connection circuit having a semiconductor switch and a diode connected in inverse-parallel, and a plurality of diodes connected in series, the two inverse-parallel connection circuits and the plurality of diodes being connected in parallel;
a smoothing capacitor connected between the DC terminals of the bridge circuit;
a load connected to both ends of the smoothing capacitor;
a current detecting unit configured to detect an input current flowing in the power receiving coil;
a voltage detecting unit configured to detect a voltage between the DC terminals of the bridge circuit; and
a control unit configured to perform switching of the semiconductor switch so that a voltage between the AC terminals of the bridge circuit becomes a positive-negative voltage whose peak value is the voltage between the DC terminals in equal periods before and after a center point shifted from respective zero crossing points in one cycle of the input current by a compensation period and becomes zero voltage in other periods, the compensation period being calculated according to an amplitude of a fundamental wave component of the voltage between the AC terminals of the bridge circuit achieved when a phase of the input current detected by the current detecting unit matches a phase of an induced voltage of the power receiving coil, and being indicated using a voltage applied to the resonance circuit and the induced voltage of the power receiving coil.

\* \* \* \* \*